US012608588B2

(12) United States Patent
Lam et al.

(10) Patent No.: US 12,608,588 B2
(45) Date of Patent: Apr. 21, 2026

(54) METHODS, SYSTEMS, AND MEDIA FOR CONTEXTUAL DISCRIMINATIVE EXPLANATION OF CONVOLUTIONAL NEURAL NETWORKS

(71) Applicants: Cho Ho Lam, Burnaby (CA); Yong Zhang, Richmond (CA)

(72) Inventors: Cho Ho Lam, Burnaby (CA); Yong Zhang, Richmond (CA)

(73) Assignee: HUAWEI CLOUD COMPUTING TECHNOLOGIES CO., LTD., Gui Zhou Province (CN)

( * ) Notice: Subject to any disclaimer, the term of this patent is extended or adjusted under 35 U.S.C. 154(b) by 1009 days.

(21) Appl. No.: 17/747,672

(22) Filed: May 18, 2022

(65) Prior Publication Data

US 2023/0376724 A1 Nov. 23, 2023

(51) Int. Cl.
| | |
|---|---|
| *G06N 3/04* | (2023.01) |
| *G06V 10/70* | (2022.01) |
| *G06V 10/771* | (2022.01) |
| *G06V 10/82* | (2022.01) |

(52) U.S. Cl.
CPC ............. *G06N 3/04* (2013.01); *G06V 10/768* (2022.01); *G06V 10/771* (2022.01); *G06V 10/82* (2022.01)

(58) Field of Classification Search
None
See application file for complete search history.

(56) References Cited

U.S. PATENT DOCUMENTS

| | | | | |
|---|---|---|---|---|
| 2011/0282897 A1* | 11/2011 | Li | ......................... | G06V 10/771 |
| | | | | 707/769 |
| 2015/0063688 A1* | 3/2015 | Bhardwaj | ............... | G06T 11/60 |
| | | | | 382/159 |
| 2021/0110275 A1* | 4/2021 | Chen | ....................... | G06F 18/22 |
| 2022/0222924 A1* | 7/2022 | Pan | .................... | G06V 10/7625 |
| 2023/0076559 A1* | 3/2023 | Sankarapu | ............. | G06Q 40/03 |

OTHER PUBLICATIONS

R. R. Selvaraju, et al. "Grad-CAM: Visual explanations from deep networks via gradient-based localization". Int J Comput Vis 128, 336-359 (2020).
Y. Goyal, Z., et al. "Counterfactual visual explanations". In ICML, 2019.

* cited by examiner

*Primary Examiner* — Mandrita Brahmachari

(57) ABSTRACT

Methods, systems and media for explaining a basis for a binary inference task performed by a neural network. Binary relationships are identified between features detected by the trained neural network and data samples in which those features are detected. Sets of features providing an inference context are then identified in tandem with sets of features providing the inference basis within a given inference context. Each context, basis pair potentially provides an explanation for the inference behavior of the neural network. Human perceptible representations of such pairs are generated to explain the inference behavior of the neural network, including automatically identifying similar samples sharing both the context and basis, and automatically identifying likely alternative samples sharing the context but not the basis.

16 Claims, 11 Drawing Sheets

708A

120

Input data

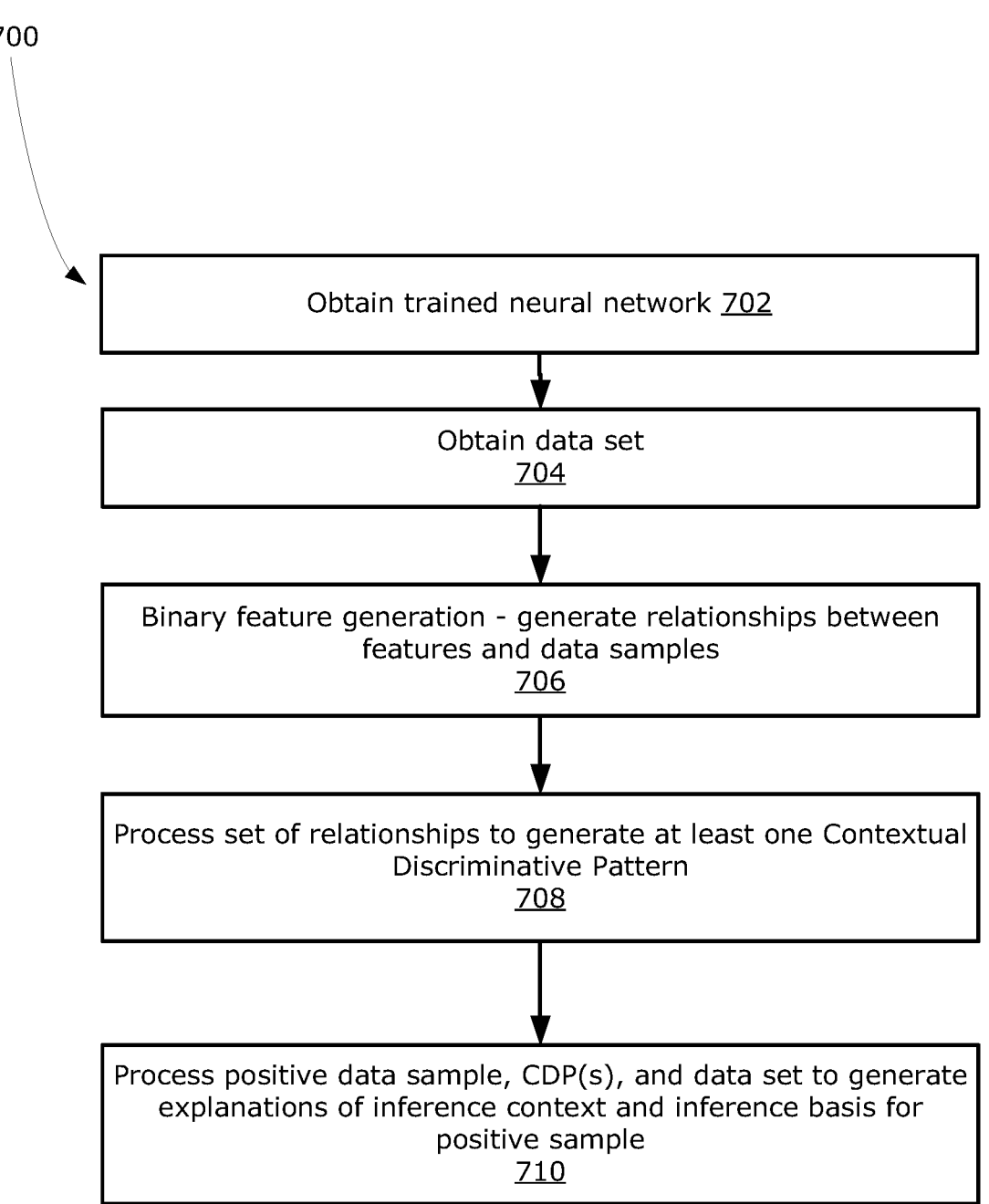

700

Obtain trained neural network 702

Obtain data set
704

Binary feature generation - generate relationships between
features and data samples
706

Process set of relationships to generate at least one Contextual
Discriminative Pattern
708

Process positive data sample, CDP(s), and data set to generate
explanations of inference context and inference basis for
positive sample
710

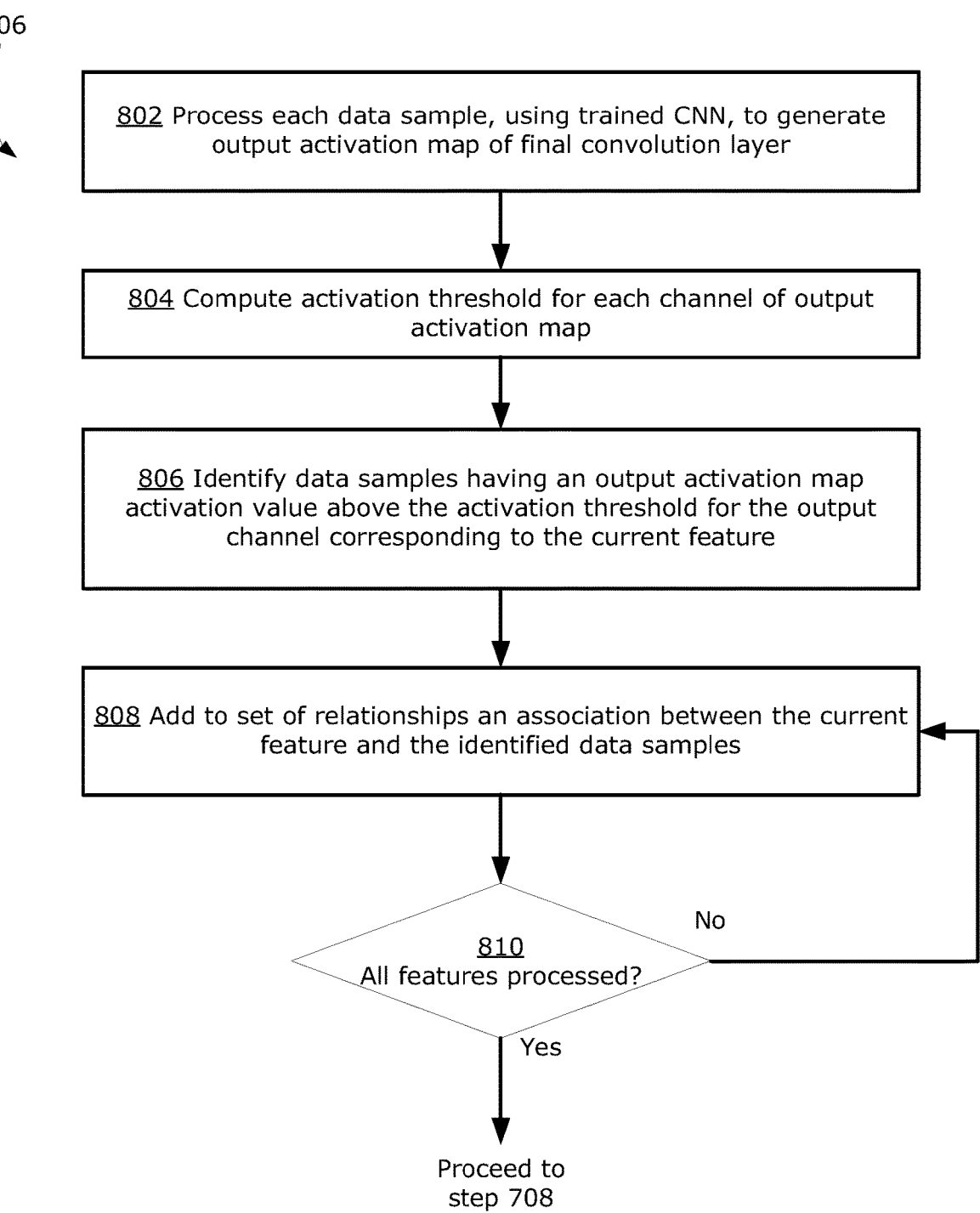

802 Process each data sample, using trained CNN, to generate output activation map of final convolution layer 804 Compute activation threshold for each channel of output activation map 806 Identify data samples having an output activation map activation value above the activation threshold for the output channel corresponding to the current feature 808 Add to set of relationships an association between the current feature and the identified data samples 810 All features processed?

No

Yes

Proceed to step 708

902 Select contextual features and discriminative features of current CDP such that discriminativeness value of the inference basis within the inference context is above discriminativeness threshold 906
Generate next CDP 904 Additional CDPs desired?

Yes

No

Proceed to
step 710

710

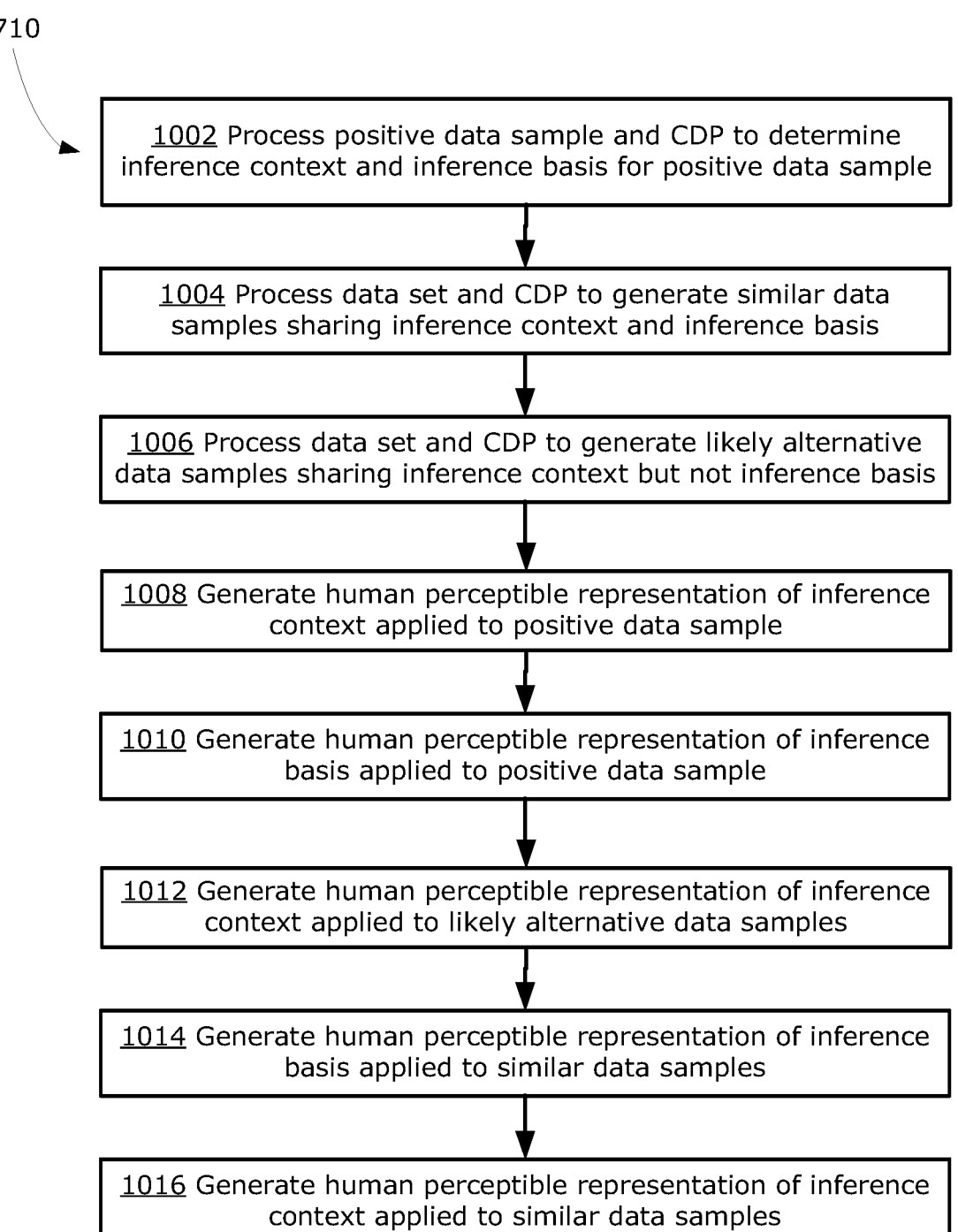

1002 Process positive data sample and CDP to determine inference context and inference basis for positive data sample

1004 Process data set and CDP to generate similar data samples sharing inference context and inference basis

1006 Process data set and CDP to generate likely alternative data samples sharing inference context but not inference basis

1008 Generate human perceptible representation of inference context applied to positive data sample

1010 Generate human perceptible representation of inference basis applied to positive data sample

1012 Generate human perceptible representation of inference context applied to likely alternative data samples

1014 Generate human perceptible representation of inference basis applied to similar data samples

1016 Generate human perceptible representation of inference context applied to similar data samples

FIG. 10

METHODS, SYSTEMS, AND MEDIA FOR CONTEXTUAL DISCRIMINATIVE EXPLANATION OF CONVOLUTIONAL NEURAL NETWORKS

FIELD

The present disclosure relates to artificial neural networks, including convolutional neural networks and the interpretation and explanation thereof.

BACKGROUND

Artificial neural networks are computational structures used for predictive modelling. A neural network typically includes multiple layers of neurons, each neuron receiving inputs from a previous layer, applying a set of weights to the inputs, and combining these weighted inputs to generate an output, which is in turn provided as input to one or more neurons of a subsequent layer. The output of a neural network is typically an inference performed with respect to the input data; and example of an inference task is classification, in which an input data sample is inferred to belong to one of a plurality of classes or categories.

A layer of neurons uses filters to define the relationship between the outputs of the neurons of the previous layer and the outputs of the neurons of the current layer. A layer of the neural network receives a data input, usually in the form of a data array of known dimensions: in the case of neural networks operating on 2D data such as image data, the data input to a layer of the network is generally a 3D array consisting of a set of multiple 2D input activation maps (also called input feature maps or input channels). By applying the set of filters to the set of input activation maps, the layer generates a data output, which is typically a data array having known dimensions: again, in the case of neural networks operating on 2D data, the data output of a layer of the network is generally a 3D array consisting of a set of multiple 2D output activation maps (also called output feature maps or output channels).

Deep neural networks (DNNs) are a particular type of neural network trained using deep learning techniques. DNNs have achieved tremendous success over the last decade in a wide range of tasks. However, despite the capability of DNNs, they are mostly treated as black-box models—the interior logic of a DNN is typically opaque or incomprehensible to humans. The lack of human-understandable interpretation of DNNs has made it difficult to promote the use of artificial intelligence (AI) systems in risk-sensitive domains like healthcare, finance, and security.

Thus, there exists a need to communicate to human users, especially non-experts, information regarding the nature of the decision-making occurring inside DNNs to reassure them of the safety and reliability of deploying DNNs for various critical applications. In order to communicate meaningful information regarding the inner workings of a DNN, the model embodied by the DNN must be interpreted or explained. An interpretation or explanation of the DNN is typically a human-perceptible and human-understandable symbolic representation of the behaviour of the DNN, in general or with respect to one or more example inputs. For example, a DNN trained to perform a computer vision task may be explained by generating images showing regions of an input image that are highly salient to the ultimate output (i.e., the inference) generated by the trained DNN. In the context of a DNN trained to perform a natural language processing task, an explanation of the behavior of the DNN could include a textual description of the reasoning process by which the DNN generated its output.

A typical way of explaining a DNN's inference behavior is to provide one explanation against all other possibilities. However, any explanation has its own context: it depends on what alternatives the input is being compared to. If these alternatives are similar to the original input, the explanation will be more informative, as the rules of features distinguishing the input from the similar alternatives represent the hardest part of the classification problem.

For example, it is easy to determine why a motorcycle is not a book. But when comparing to other vehicles, an explanatory technique needs to be more specific about the important features distinguishing the motorcycle from other vehicles. In this example, the vehicles serve as the context of the decision, also called the inference context. Explaining why the input is a motorcycle instead of a different type of vehicle is also much more informative.

Various approaches to DNN interpretation have been made in the research literature. Gradient-weighted Class Activation Mapping (Grad-CAM) is an approach described by Ramprasaath R. Selvaraju, Michael Cogswell, Abhishek Das, Ramakrishna Vedantam, Devi Parikh and Dhruv Batra. "Grad-CAM: Visual Explanations from Deep Networks via Gradient-based Localization". *Int J Comput Vis* 128, 336-359 (2020). Based on a sample image provided as the input to the neural network, a set of output feature maps of a penultimate layer of the neural network are multiplied by an average of the gradients of the output feature maps, and the results are added to generate a heatmap. However, the heatmap representation only applies to images highly similar to the input image, potentially rendering the interpretation less useful and robust due to its narrow applicability. In addition, Grad-CAM provides no information on the decision logic of the model, and only returns one explanation or interpretation even if multiple factors contributed to the decision. One consequence of this shortcoming is that the Grad-CAM explanation tends to focus on the classes that can be easily separated from the target class, and hence is less useful to the user. Furthermore, Grad-CAM can only interpret one image at a time; the faithfulness and robustness of such interpretations are therefore questionable.

Another existing approach to deep neural network explanation is provided by Counterfactual Visual Explanations (CVE), described by Y. Goyal, Z. Wu, J. Ernst, D. Batra, D. Parikh and S. Lee in "Counterfactual visual explanations", ICML, 2019. CVE works in the following three steps: first, the user provides an input image as well as a distractor image. Second, an algorithm solves an optimization to find one region in each image having the following properties: when the region in the input image is replaced by the region in the distractor image, the prediction of the input image will change to that of the distractor image. Third, the region chosen in the input image can be considered the important feature to its prediction, as the decision would change if the chosen region were modified. However, CVE exhibits a number of limitations. First, the distractor image is chosen by the user, not discovered by the algorithm, thereby limiting the value of the distractor image as providing the relevant inference context. Second, CVE only provides insight between a pair of images, i.e., the two input images supplied by the user.

Thus, there exists a need for a technique for explaining the basis and context of inferences performed by deep neural networks and other models that overcomes one or more of the shortcomings of the existing approaches described above.

SUMMARY

In various examples, the present disclosure describes methods, systems, and computer-readable media for explaining a basis for a binary inference task performed by a neural network, such as a classification task. A data set of input data samples is processed, using the neural network after it has been trained to perform the binary inference task, to identify relationships between features detected by the trained neural network and data samples in which those features are detected. Sets of features providing an inference context are then identified in tandem with sets of features providing the inference basis (i.e., the basis for a positive inference as opposed to a negative inference) within a given inference context. Each inference context paired with an associated inference basis is referred to as a Contextual Discriminative Pattern (CDP). Each CDP potentially provides an explanation for the inference behavior of the neural network. Human perceptible representations of the context and the basis of one or more CDPs can then be generated to explain the inference behavior of the neural network, by automatically identifying similar samples sharing both the context and basis, and automatically identifying likely alternative samples sharing the context but not the basis.

Thus, in some examples contextual discriminative explanations may be generated that automatically identify likely alternative scenarios, the common characteristics of the scenarios, and the ultimate reason why a certain decision is made instead of the other possibilities. Examples described herein may provide explanations for the inference behavior of a model applied to a given data sample, by using one or more of several output formats: similar data samples, likely alternative data samples, common (i.e. shared contextual) features, and/or discriminative features. Similar data samples refer to, for a given input data sample, similar instances from the same class. Likely alternative data samples refer to, for a given input data sample, likely alternative instances from other classes that are easily confused with the input data sample and its similar data samples. Common or contextual features refers to the common features shared among the input data sample, the similar data samples, and the likely alternative data samples. These common features serve as the context of the explanation. Discriminative features refers to the discriminative features that ultimately separate the input data sample and the similar data samples from the likely alternative data samples.

Some embodiments described herein may thereby solve one or more technical problems in building a deep neural network explanation system. First, the system may find a group of instances (i.e. data samples) that share a meaningful context, i.e., finding a large group of instances across different classes that share visual similarity. Second, the system may find the set of common features that constitute the context: even if the group of instances that share a meaningful context has already been identified, the system needs a way to efficiently search through an exponential number of feature combinations to find their common features. Third, the system may simultaneously find the common features and the discriminative features. Beyond finding the common features, the system also has to search for a set of discriminative features that discriminates the target class from the likely alternatives, despite their similarity.

Thus, an object of the embodiments described herein is to build a DNN explanation system that is able to identify various groups of instances that share a meaningful context, what the context is, and how the discriminative decision is made based on the context.

As used herein, the term "model" may refer to a mathematical or computational model. A model may be said to be implemented, embodied, run, or executed by an algorithm, computer program, or computational structure or device. In the present example embodiments, a model may refer to a predictive model intended to model human perception or interpretation of input such as images, and may be implemented by an algorithm trained using deep learning techniques, such as a deep neural network (DNN). The terms DNN, deep neural network, neural network, artificial neural network, and network may be used interchangeably herein unless indicated otherwise.

An activation map or feature map may refer to an input (e.g., "input activation map") or output (e.g., "output activation map") of a layer of an artificial neural network. A layer of a neural network may receive multiple input activation maps as inputs and may produce multiple output activation maps as outputs.

An "input sample" may refer to any data sample used as an input to a neural network, such as image data. It may refer to a training data sample used to train a neural network, or to a data sample provided to a trained neural network which will infer (i.e. predict) an output based on the data sample for the task for which the neural network has been trained. Thus, for a neural network that performs a task of image classification, an input sample may be a single digital image.

As used herein, a statement that an element is "for" a particular purpose may mean that the element performs a certain function or is configured to carry out one or more particular steps or operations, as described herein.

As used herein, statements that a second element is "based on" a first element may mean that characteristics of the second element are affected or determined at least in part by characteristics of the first element. The first element may be considered an input to an operation or calculation, or a series of operations or computations, which produces the second element as an output that is not independent from the first element.

As used herein, a "representation", "explanation", "interpretation", or "human perceptible representation" of a neural network or model may refer to a human-perceptible (e.g., visual) representation of data that approximates or corresponds to an inferential behavior of the neural network or model being represented or explained. Generation of such a representation, explanation, or interpretation may be referred to as explaining or interpreting the neural network or model.

A used herein, a "heatmap" or "heat map" refers to a way to visualize a matrix using different colour values to indicate the values of elements of the matrix corresponding to pixel locations or regions of an image. Some heatmaps indicate higher matrix element values using warmer colors. A heatmap can be applied to a corresponding image by altering the color values of the image in accordance with the color values of the heatmap.

As used herein, the terms "classification" and "categorization" are used interchangeably and synonymously (as are "classify" and "categorize", "class and "category", "classifier" and "categorizer", etc.). In some examples, the behavior of a classification model may be described as classifying an input sample into a first category or a second category; it will be appreciated that each of the first and second category may include multiple categories, e.g., the first category may be "dog" whereas the second category may include multiple categories (e.g., "cat", "human", and "truck"), none of which are "dog", such that the second category may be regarded as "not dog".

A "binary inference task" is an inference task performed by a neural network or model that generates a binary inference. Classification tasks can be regarded as binary inference tasks insofar as the output of a classification model includes a binary decision with respect to the classification of an input data sample with respect to each of one or more classes or sets of classes.

In some aspects, the present disclosure describes a method for explaining a basis for a binary inference task performed by a neural network trained to perform the binary inference task. A data set is obtained, comprising a plurality of data samples. The plurality of data samples comprise a negative data subset comprising a plurality of negative data samples associated with a negative result of the binary inference task performed by the trained neural network, and a positive data subset comprising a plurality of positive data samples associated with a positive result of the binary inference task performed by the trained neural network. The data set is processed, using the trained neural network, to generate a set of relationships between features and data samples. The set of relationships identifies, for each feature of a plurality of features, one or more data samples of the data set associated with the feature. The set of relationships is processed to generate at least one contextual discriminative pattern (CDP). Each CDP identifies an inference context comprising one or more contextual features of the plurality of features, and an inference basis comprising one or more discriminative features of the plurality of features. The inference context is associated with a first plurality of negative data samples of the negative data subset and a second plurality of positive data samples of the positive data subset. The inference basis is more highly associated with the second plurality of positive data samples than with the first plurality of negative data samples.

In some aspects, the present disclosure describes a system comprising a processing system comprising one or more processor devices, and a memory storing instructions which, when executed by the processing system, cause the system to explain a basis for a binary inference task performed by a neural network trained to perform the binary inference task. A data set is obtained, comprising a plurality of data samples. The plurality of data samples comprise a negative data subset comprising a plurality of negative data samples associated with a negative result of the binary inference task performed by the trained neural network, and a positive data subset comprising a plurality of positive data samples associated with a positive result of the binary inference task performed by the trained neural network. The data set is processed, using the trained neural network, to generate a set of relationships between features and data samples. The set of relationships identifies, for each feature of a plurality of features, one or more data samples of the data set associated with the feature. The set of relationships is processed to generate at least one contextual discriminative pattern (CDP). Each CDP identifies an inference context comprising one or more contextual features of the plurality of features, and an inference basis comprising one or more discriminative features of the plurality of features. The inference context is associated with a first plurality of negative data samples of the negative data subset and a second plurality of positive data samples of the positive data subset. The inference basis is more highly associated with the second plurality of positive data samples than with the first plurality of negative data samples.

In some aspects, the present disclosure describes a non-transitory computer-readable medium having instructions tangibly stored thereon, wherein the instructions, when executed by a processing system, cause the processing system to explain a basis for a binary inference task performed by a neural network trained to perform the binary inference task. A data set is obtained, comprising a plurality of data samples. The plurality of data samples comprise a negative data subset comprising a plurality of negative data samples associated with a negative result of the binary inference task performed by the trained neural network, and a positive data subset comprising a plurality of positive data samples associated with a positive result of the binary inference task performed by the trained neural network. The data set is processed, using the trained neural network, to generate a set of relationships between features and data samples. The set of relationships identifies, for each feature of a plurality of features, one or more data samples of the data set associated with the feature. The set of relationships is processed to generate at least one contextual discriminative pattern (CDP). Each CDP identifies an inference context comprising one or more contextual features of the plurality of features, and an inference basis comprising one or more discriminative features of the plurality of features. The inference context is associated with a first plurality of negative data samples of the negative data subset and a second plurality of positive data samples of the positive data subset. The inference basis is more highly associated with the second plurality of positive data samples than with the first plurality of negative data samples.

In some examples, the method further comprises obtaining an input data sample to be explained, processing the input data sample using the trained neural network to determine that the input sample is associated with the positive result of the binary inference task, processing the input data sample and the at least one CDP to determine that the input sample is associated with the inference context of a first CDP of the at least one CDP and the inference basis of the first CDP, and processing the data set and the first CDP to generate one or more similar data samples sharing the inference context and the inference basis with the input data sample, and one or more likely alternative data samples sharing the inference context but not the inference basis with the input data sample.

In some examples, the method further comprises generating a human perceptible representation of the inference basis applied to the input data sample, generating a human perceptible representation of the inference context applied to at least one of the likely alternative data samples, and generating a human perceptible representation of the inference basis applied to at least one of the similar data samples.

In some examples, the data samples are images. The human perceptible representation of the inference basis is a heatmap indicating at least one pixel region associated with at least one of the discriminative features. The human perceptible representation of the inference context is a heatmap indicating at least one pixel region associated with at least one of the contextual features.

In some examples, the neural network is a convolutional neural networking comprising at least a final convolution layer configured to generate an output activation map having a plurality of output channels. Each output channel is associated with a feature of the plurality of features. Each output channel comprises a plurality of activation values. Processing the data set, using the trained neural network, to generate the set of relationships comprises a number of steps. Each respective data sample of the data set is processed, using the trained convolutional neural network, to generate a respective output activation map of the final convolution layer. For each feature of the plurality of features, the output activation maps are processed to identify a first one or more data samples of the data set for which the respective output activation map has at least one activation value of the output channel corresponding to the feature above an activation threshold. The set of relationships is generated to include an association between the feature and the first one or more data samples.

In some examples, the activation threshold is generated by identifying an activation threshold value effective to identify a predetermined proportion of the data samples of the data set as the first one or more data samples.

In some examples, processing the set of relationships to generate at least one CDP comprises selecting, from the plurality of features, the one or more contextual features of a first CDP and the one or more discriminative features of the first CDP such that a discriminativeness value of the inference basis within the inference context is above a discriminativeness threshold.

In some examples, the discriminativeness value of the inference basis within the inference context is computed as a difference between two ratios. The first ratio is a ratio between: a first number indicating how many data samples in the positive data subset are associated with both the one or more discriminative features and the one or more contextual features, and a second number indicating how many data samples in the positive data subset are associated with the one or more contextual features. The second ratio is a ratio between: a third number indicating how many data samples in the negative data subset are associated with both the one or more discriminative features and the one or more contextual features, and a fourth number indicating how many data samples in the negative data subset are associated with the one or more contextual features.

In some examples, processing the set of relationships to generate the at least one CDP further comprises, for each additional CDP of one or more additional CDPs, selecting, from the plurality of features, the one or more contextual features of the additional CDP and the one or more discriminative features of the additional CDP such that a discriminativeness value of the inference basis within the inference context is above a discriminativeness threshold.

In some examples, processing the set of relationships to generate the at least one CDP further comprises, for the first CDP and each additional CDP, computing a respective coverage value of the one or more contextual features of the respective CDP, and selecting, from the first CDP and the one or more additional CDPs, the at least one CDP such that each CDP of the at least one CDP has a coverage value above a coverage threshold.

In some examples, computing the coverage value of the one or more contextual features of a CDP comprises computing the second number indicating how many data samples in the positive data subset are associated with the one or more contextual features of the CDP, computing the fourth number indicating how many data samples in the negative data subset are associated with the one or more contextual features of the CDP, and computing the coverage value as the lower of the second number and the fourth number.

In some aspects, the present disclosure describes a non-transitory computer-readable medium having instructions tangibly stored thereon, wherein the instructions, when executed by a processing system, cause the processing system to perform the method steps described above.

BRIEF DESCRIPTION OF THE DRAWINGS

Reference will now be made, by way of example, to the accompanying drawings which show example embodiments of the present application, and in which:

FIG. 7 is a flowchart of an example method for explaining the inference basis of a neural network trained to perform a binary inference task, in accordance with the present disclosure.

FIG. 8 is a flowchart of an example method for performing the binary feature generation step of the method of FIG. 7.

FIG. 10 is a flowchart of an example method for performing the explanation generation step of the method of FIG. 7.

Similar reference numerals may have been used in different figures to denote similar components.

DESCRIPTION OF EXAMPLE EMBODIMENTS

Methods, systems, and computer-readable media for explaining a basis for a binary inference task performed by a neural network will now be described with reference to example embodiments.

Example embodiments will be described herein with reference to deep neural networks (DNNs) that are trained using supervised learning for a particular binary interference task. After being trained, the trained DNN is used to perform the particular inference task such as object classification using image data samples as inputs. However, it will be appreciated that the techniques described herein are potentially applicable to the training of a variety of artificial neural networks to perform a variety of inference tasks using supervised or unsupervised learning using a variety of data sample types.

The context in which example embodiments may operate will now be described with reference to FIGS. 1-3.

Example Computing System

A system or device, such as a computing system, that may be used in examples disclosed herein is first described.

Figure 1:
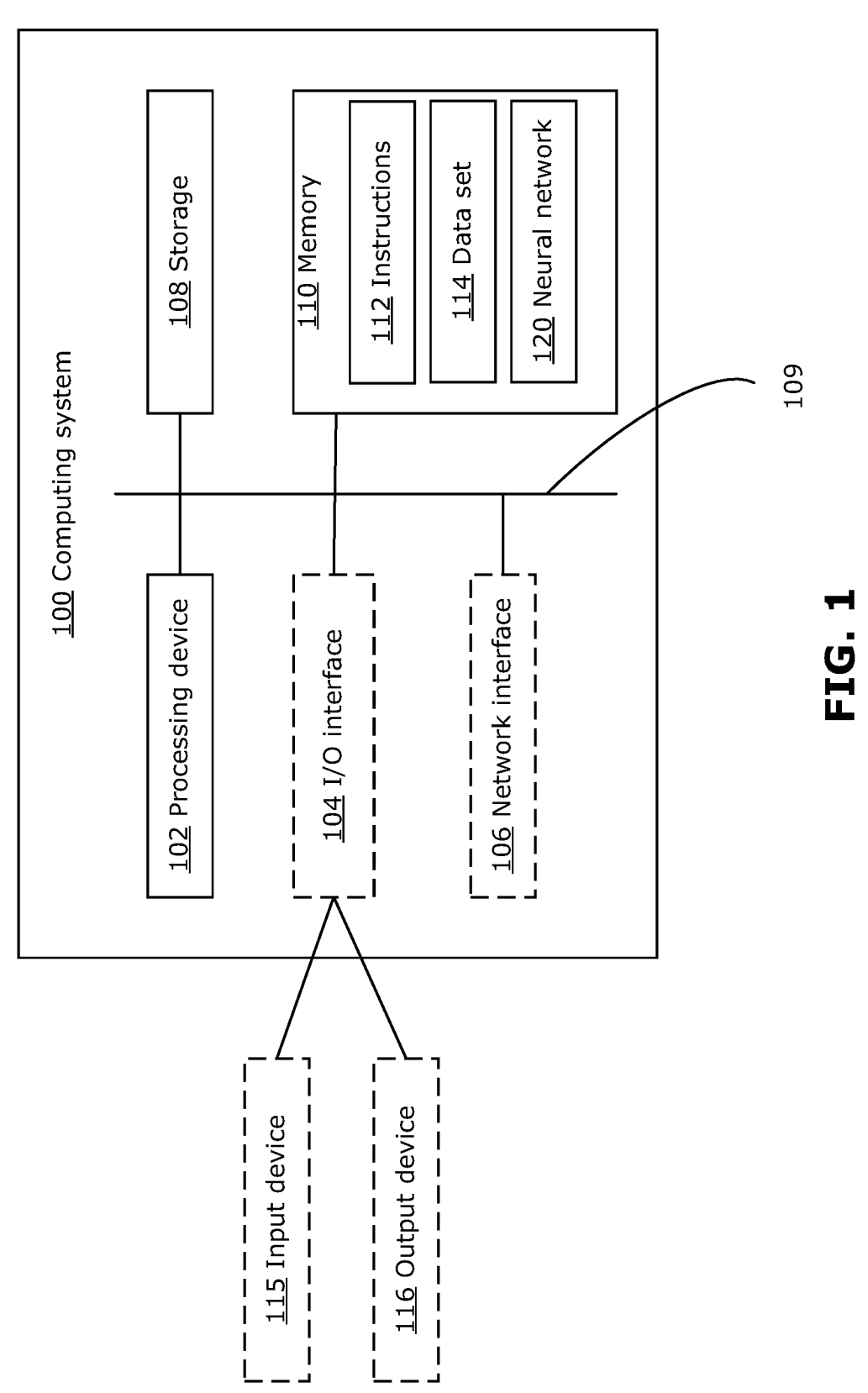
FIG. 1 is a block diagram of an example computing system that may be used to implement examples described herein.

FIG. 1 is a block diagram of an example simplified computing system 100, which may be a device that is used to execute instructions in accordance with examples disclosed herein, including the instructions of a trained neural network (such as a convolutional neural network, e.g., a deep convolutional neural network) to perform the specific task for which the neural network has been trained (e.g. image classification, object recognition, etc.). Other computing systems suitable for implementing embodiments described in the present disclosure may be used, which may include components different from those discussed below. In some examples, the computing system 100 may be implemented across more than one physical hardware unit, such as in a parallel computing, distributed computing, virtual server, or cloud computing configuration. Although FIG. 1 shows a single instance of each component, there may be multiple instances of each component in the computing system 100.

The computing system 100 may include a processing system having one or more processing devices 102, such as a central processing unit (CPU) with a hardware accelerator, a graphics processing unit (GPU), a tensor processing unit (TPU), a neural processing unit (NPU), a microprocessor, an application-specific integrated circuit (ASIC), a field-programmable gate array (FPGA), a dedicated logic circuitry, a dedicated artificial intelligence processor unit, or combinations thereof.

The computing system 100 may also include one or more optional input/output (I/O) interfaces 104, which may enable interfacing with one or more optional input devices 115 and/or optional output devices 116. In the example shown, the input device(s) 115 (e.g., a keyboard, a mouse, a microphone, a touchscreen, and/or a keypad) and output device(s) 116 (e.g., a display, a speaker and/or a printer) are shown as optional and external to the computing system 100. In other examples, one or more of the input device(s) 115 and/or the output device(s) 116 may be included as a component of the computing system 100. In other examples, there may not be any input device(s) 115 and output device(s) 116, in which case the I/O interface(s) 104 may not be needed.

The computing system 100 may include one or more optional network interfaces 106 for wired or wireless communication with a network (e.g., an intranet, the Internet, a P2P network, a WAN and/or a LAN) or other node. The network interfaces 106 may include wired links (e.g., Ethernet cable) and/or wireless links (e.g., one or more antennas) for intra-network and/or inter-network communications.

The computing system 100 may also include one or more storage units 108, which may include a mass storage unit such as a solid state drive, a hard disk drive, a magnetic disk drive and/or an optical disk drive. The computing system 100 may include one or more memories 110, which may include a volatile or non-volatile memory (e.g., a flash memory, a random access memory (RAM), and/or a read-only memory (ROM)). The non-transitory memory(ies) 110 may store instructions for execution by the processing device(s) 102, such as to carry out examples described in the present disclosure. The memory(ies) 110 may include other software instructions, such as for implementing an operating system and other applications/functions. In some examples, memory 110 may include software instructions for execution by the processing device 102 to train a neural network 120 and/or to implement a trained neural network 120, as disclosed herein. The non-transitory memory(ies) 110 may store data, such as a data set 114 including multiple data samples.

In some other examples, one or more data sets and/or modules may be provided by an external memory (e.g., an external drive in wired or wireless communication with the computing system 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 109 providing communication among components of the computing system 100, including the processing device(s) 102, optional I/O interface(s) 104, optional network interface(s) 106, storage unit(s) 108 and/or memory(ies) 110. The bus 109 may be any suitable bus architecture including, for example, a memory bus, a peripheral bus or a video bus.

Example Deep Neural Network

Figure 2:
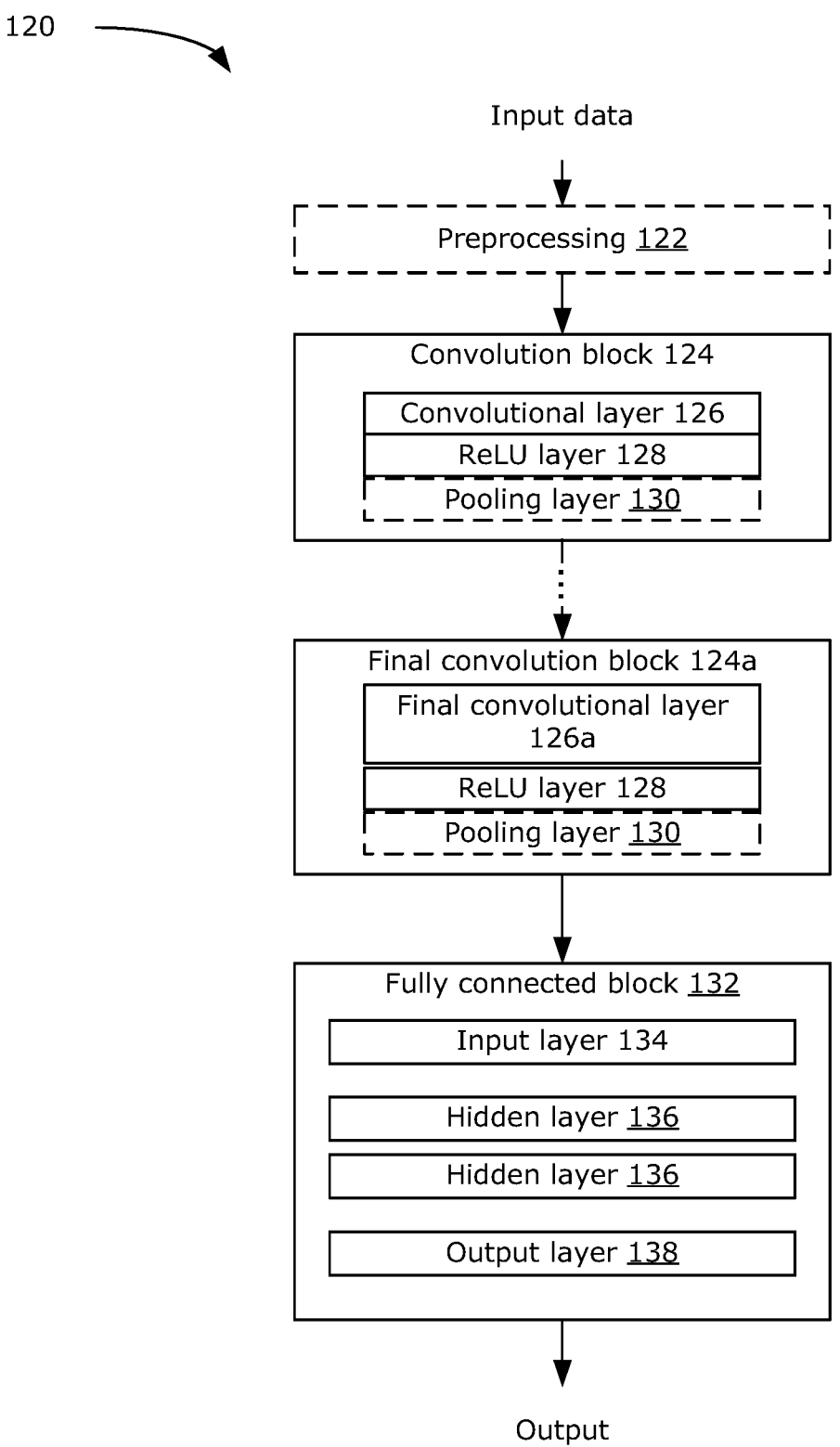
FIG. 2 is a schematic diagram of an example architecture for a deep neural network (DNN) that may be used to implement examples described herein.

FIG. 2 illustrates an example architecture of a deep neural network (DNN) 120, such as a deep convolutional neural network (deep CNN). The DNN 120 in this example is constructed and arranged for performing a specific task during training and inference, such as object detection, object recognition and classification (i.e. object localization and classification), audio recognition and classification, text recognition and classification, and the like. The DNN 120 has been simplified, is not intended to be limiting and is provided for the purpose of illustration only. The input data to the DNN 120 may be, for example, image data representing a digital image, audio data representing an audio file, or text data (i.e. an embedding representing a word or a sentence). A single sample of input data (e.g., a single image) may be referred to herein as an "input sample". Optional elements are shown in dashed lines.

The DNN 120 in this example is a convolutional neural network (CNN). It includes one or more convolution blocks 124 configured in series and ending with a final convolution block 124a, configured to perform feature learning, and a fully connected block 132 configured to perform a particular task. The DNN 120 may also optionally include a preprocessing block 122, which may perform various operations, such as normalization, to prepare the input data for a convolutional block 124.

The convolution block 124 shown in FIG. 2 may include, for example, include a convolutional layer 126, a combined non-linearity and rectification layer (e.g. ReLU layer 128) and an optional pooling layer 130. The output from each layer in the convolution block 124 is used as input to the next layer in the convolution block 124. In other words, an output from a convolutional layer 126 may be used as an input to a following ReLU layer 128, and the output of the ReLU layer 128 may be used as an input to a pooling layer 130, or may be used as an input to a convolutional layer 126 of another convolutional block 124, to continue a convolution operation. Similarly, the final convolution block 124a includes a final convolution layer 126a, a ReLU layer 128, and optionally a pooling layer 130.

The internal operating principles of a convolutional layer 126 are described in detail below with reference to FIG. 3. In summary, a convolutional layer 126 performs convolution operations on its input activation maps to generate an output that consists of output activation maps generated from the input activation maps.

Because a quantity of parameters (e.g. weights) of filters of a convolutional layer 126 usually needs to be reduced, a pooling layer 130 may follow a convolutional layer 126 in a convolutional block 124. In an image processing process, a purpose of the pooling layer 130 is to reduce a size of the output activation maps generated by ReLU layer 128. The pooling layer 130 may include an average pooling operator and/or a maximum pooling operator, to perform sampling on the input activation maps to obtain the output activation maps of a relatively small size. The average pooling operator may compute a pixel value in the activation map within a specific range, to generate an average value as an average pooling result. The maximum pooling operator may obtain, as a maximum pooling result, a pixel with a largest value within the specific range. The size of the activation map output after processing by the pooling layer may be smaller than a size of the activation map input to the pooling layer. Each pixel in the activation map output by the pooling layer indicates an average value or a maximum value of a subarea corresponding to the activation map input to the pooling layer.

After the input data is processed by the convolution block 124, the DNN 120 is still incapable of outputting desired output information. To generate final output information (e.g., object category (i.e. class), bounding box, etc.), a fully connected block 132 of the DNN 120 generates an output from the output of the convolution block 124. The output of the convolution block 124 is output activation maps as described above.

The fully connected block 132 includes an input layer 134, one or more hidden layers 136, and an output layer 138. The output layer 138 follows the last hidden layer 136 of the fully connected block 132. In other words, the output layer 138 is a final layer in the entire DNN 120. During training of the DNN 120, training data and a supervised learning algorithm are used to train the DNN 120. After forward propagation (propagation in a direction from 124 to 138 in FIG. 2 is forward propagation) is complete a loss function similar to category (i.e. class) cross-entropy is used to compute a prediction error of the DNN 120, and back propagation (propagation in a direction from 138 to 124 in FIG. 2 is back propagation) is performed to update the parameters (e.g. weights) of the layers 128, 130, 132, 134, 136, and 128 of the DNN 120 and the weights of the filters based on the computed prediction error to reduce the prediction error between an ideal result (i.e. the ground truth in the training data) and the prediction result output by the output layer 138.

In a DNN 120 trained to perform a classification task, the last hidden layer 136 of the fully connected block 132 may be a logits layer immediately prior to the output layer 138. The logits layer generates a set of logits that correspond to a probability distribution for the classification task, indicating an inferred (i.e. predicted) probability for each of a plurality of possible categories into which the input sample may be classified. The output layer 138 may apply a Softmax function to the logits generated by the logits layer to normalize the logits into a probability distribution from 0 to 1. The Softmax function thereby generates an output of the DNN 120 consisting of two or more categories, each category having an associated classification probability associated with the corresponding input sample. Thus, in response to an input sample consisting of a photograph of a dog, a DNN 120 trained to classify images into the categories "dog" and "cat" may generate an output at its output layer 138 consisting of the classification probabilities ("dog",0.993|"cat",0.007).

It should be noted that the DNN 120 shown in FIG. 2 is merely used as an example architecture of a deep neural network. In actual application, the architecture of the DNN 120 may exist in a different form.

The above discussion provides an example that illustrates how a trained DNN may be used for performing a specific task during inference. In general the input data may have one, two or three (or more) dimensions, and the output may have any suitable format, depending on the task. The example embodiments herein shall be described in the context of a DNN that is used to perform a particular task, such as a classification task, including classification of objects in images or natural language processing (NLP). In the example embodiments described herein, the input to the DNN 120 is an image that may be pre-processed by and fed to the input layer, receiving input activation maps and generating output activation maps in the form of multi-channel 2D pixel arrays (i.e., 3D arrays defined by a pixel height, a pixel width, and a channel depth). However, it will be appreciated that data arrays of different dimensionality may be used as input or output in some embodiments, such as multi-channel 1D arrays for tasks involving e.g. audio or text inputs.

Example Convolution Layer and Activation Maps

Figure 3:
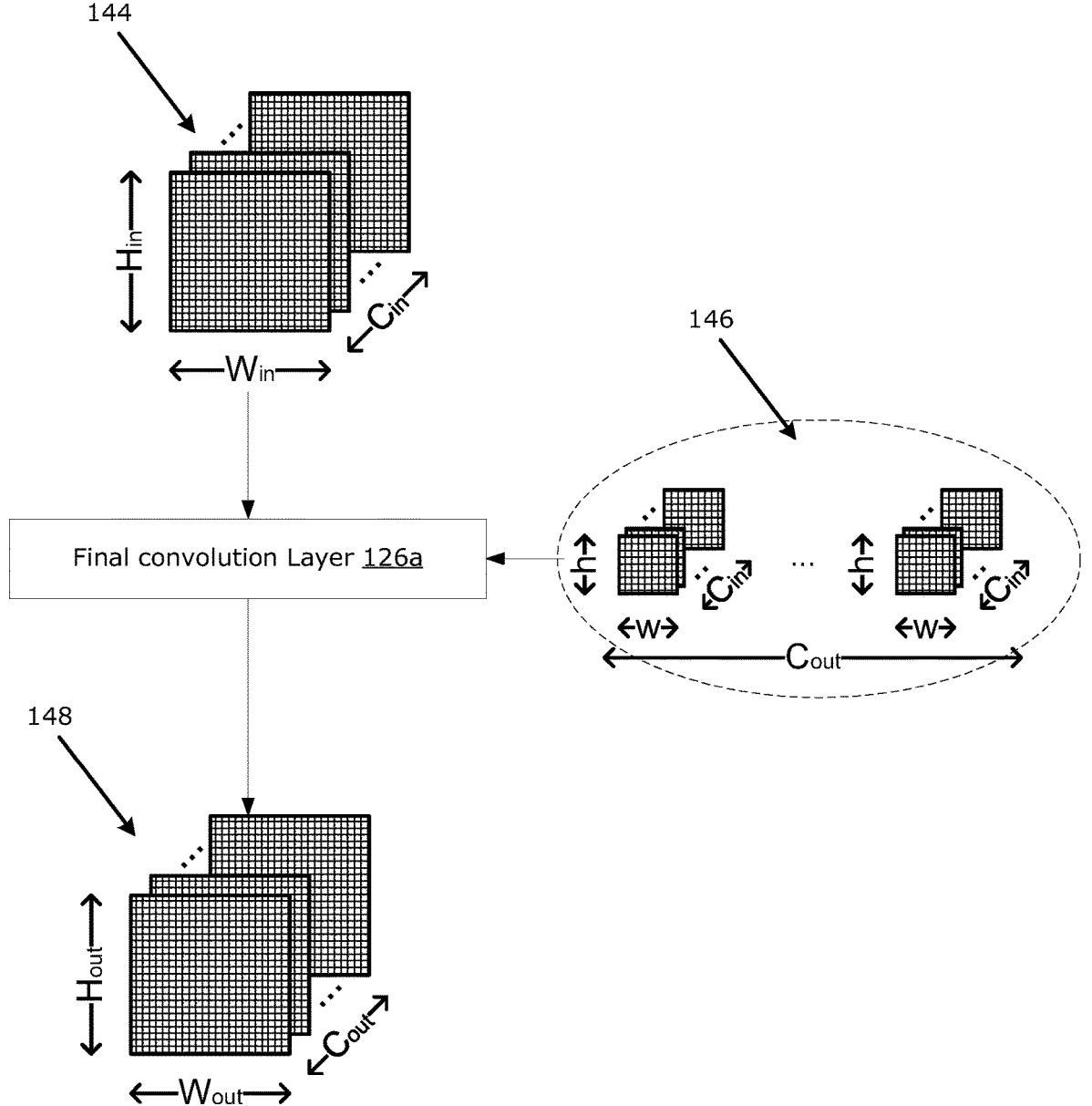
FIG. 3 is a schematic diagram of a convolution layer of the DNN of FIG. 2 showing the dimensions of an input data array, an output data array, and a set of convolution filters applied by the convolution layer.

FIG. 3 illustrates a convolution layer 126, shown here as final convolutional layer 126a, although it will be appreciated that other convolution layers 124 of a DNN may operate according to similar principles. FIG. 3 also shows the dimensions of an input data array 144, an output data array 148, and a set of convolution filters 146 applied by the final convolution layer 126a. The input data array 144 is shown here as a multi-channel set of activation maps having a number of input channels (i.e. activation maps) equal to value $C_{in}$. Each channel of the input data array 144 consists of a 2D array, such as an image consisting of a 2D pixel array, having a height $H_{in}$ and a width $W_{in}$. Thus, the number of values stored in the input data array 142 is equal to $(H_{in} \times W_{in} \times C_{in})$. The convolution filters 146 applied to the input data array 144 each have a height h, a width w, and a channel depth $C_{in}$. The final convolution layer 126a uses a number of convolution filters 146 equal to value $C_{out}$.

The final convolution layer 126a applies the convolution filters 146 to the input data array 144 in a series of convolution operations. Each convolution filter 146 is applied to the input data array 144 to generate a channel of the output data array 148, shown here as a multi-channel set of activation maps having a number of output channels (i.e. output activation maps) equal to value $C_{out}$. Each channel of the output data array 148 consists of a 2D array, such as an image consisting of a 2D pixel array, having a height $H_{out}$ and a width $W_{out}$. The relationships between $H_{in}$ and $H_{out}$, and between $W_{in}$ and $W_{out}$, are determined by the kernel dimensions h and w and the stride, padding, and other convolution configuration values or hyper-parameters used by the convolution operations of the convolution layer 126.

In some embodiments, $H_{in}=H_{out}$, and $W_{in}=W_{out}$. For example, an example embodiment may use kernel dimensions h=3 and w=3, with padding of 1 pixel and stride 1, to generate an output data array wherein $H_{in}=H_{out}$, and $W_{in}=W_{out}$. The use of a convolution layer 126 wherein $H_{in}=H_{out}$, and $W_{in}=W_{out}$ may present certain advantages, for example in embodiments using hardware or software components optimized to process input channels having fixed dimensions.

Example embodiments providing explanations of the inference basis of a neural network will now be described with reference to FIGS. 4-10.

Example CNN for Explanation

Figure 4:
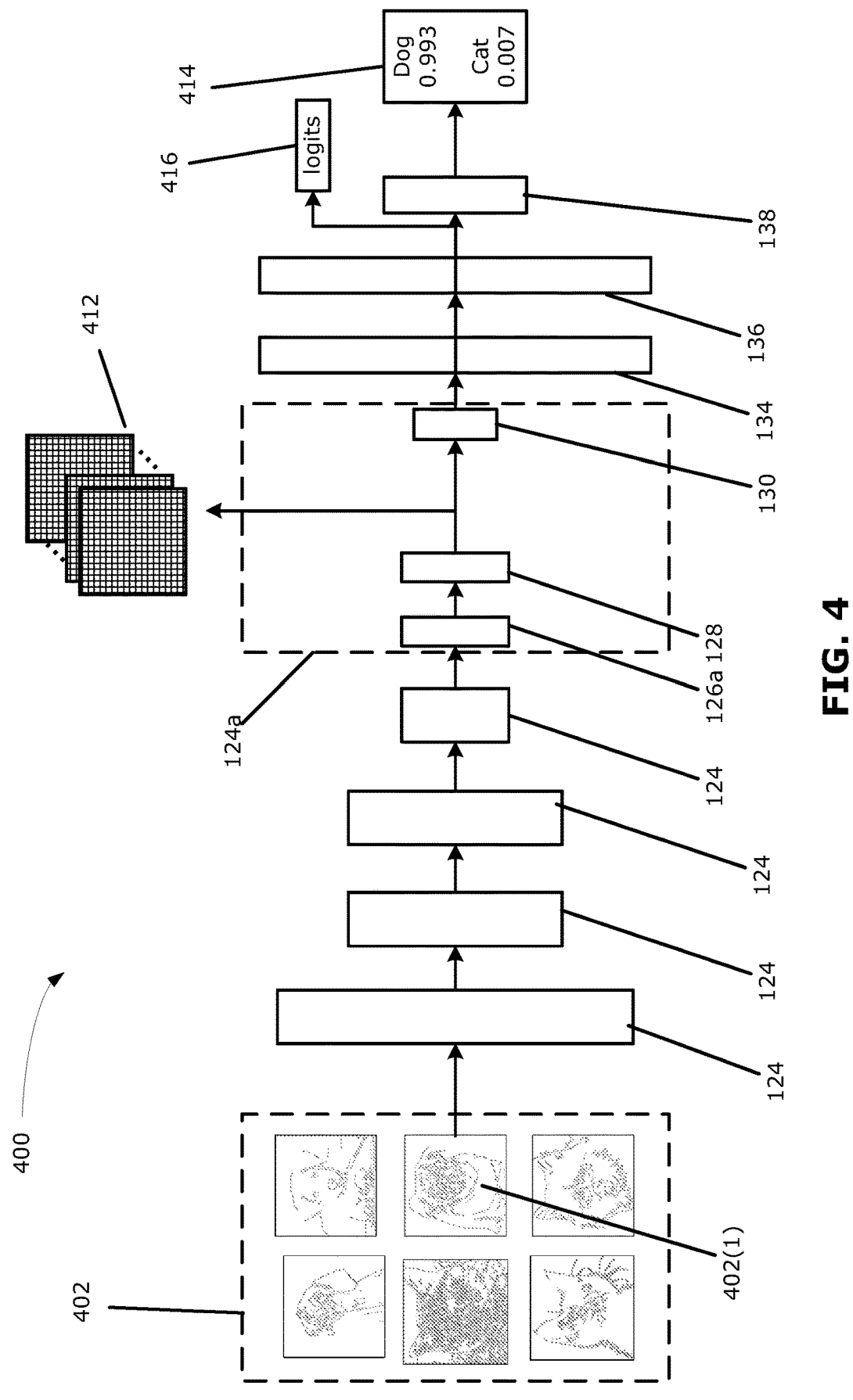
FIG. 4 is a block diagram of an example deep convolutional neural network including a final convolution layer generating an output activation map based on an input data sample, in accordance with the present disclosure.

FIG. 4 is a block diagram of an example convolutional neural network 400. In this example, the CNN 400 is trained to perform an image classification task, such as classifying each data sample of a data set of data samples 402 into a first category "dog" or a second category "cat". The CNN 400 is used to perform the image classification on a plurality of the data samples 402, thereby generating, for each data sample, a multi-channel output activation map 412 generated by the final convolution block 124a and a classification of the data sample. The classification comprises classification data 414 generated by an output layer 138 of the CNN 400.

In this example, the CNN 400 has a number of convolution layers 126 organized within convolution blocks 124, as described above with reference to FIG. 2. The multi-channel output activation map 412 is shown as the output of the ReLU layer 128 of the final convolution block 124a in this example; however, it will be appreciated that in other examples the multi-channel output activation map 412 may be generated as the output of another layer, such as the of the final convolution layer 126a or the pooling layer 130 of the final convolution block 124a.

In examples described herein, each channel of the multi-channel output activation map 412 corresponds to a different feature. Each channel is a two-dimensional matrix, with elements corresponding to pixels or pixel regions of the input data sample (e.g., 402(1)). The activation value of an element of a given channel corresponds to the degree to which the trained CNN 400 detects the presence of the corresponding feature in a pixel region of the input data sample corresponding to the location of the element within the channel of the activation map. Thus, if the input image is 100 pixels×100 pixels, and channel 3 of the multi-channel output activation map 412 corresponds to a "horizontal line" feature, and each channel of the multi-channel output activation map 412 is a matrix of dimensions 10 elements by 10 elements, then a high activation value for the upper-right-most element of channel 3 of the multi-channel output activation map 412 would indicate that the trained CNN 400 has detected a horizontal line in the top-right-most 10-by-10 pixel region of the input data sample.

The CNN 400 also includes a fully connected block consisting of an input layer 134, a hidden layer 136, and an output layer 138 of the CNN 400. In this example, the input layer 134 and hidden layer 136 may be fully-connected layers, and the hidden layer 136 may function as a logits layer generating a set of logits 416 as its output. The logits 416 are received as input by the output layer 138, which may apply a Softmax function to normalize the logits 416 and thereby generate the classification data 414. For the purpose of the presently described embodiments, the logits 416 may be considered the output of the CNN 400. It will be appreciated that the term "hidden layer" is used to maintain consistency with the example neural network of FIG. 2; however, in the example CNN 400, all layers other than the first convolutional layer of the first convolutional block 124 at the left end of the CNN 400 and the final hidden layer 136 may be considered to be "hidden" layers, as they are not a first input layer or final output layer 138.

When provided with specific data sample 402(1) as input, consisting of a photograph of a dog, the CNN 400 may generate classification data 414, consisting of a probability that the specific data sample 402(1) is classified in a first category or a probability that the specific data sample 402(1) is classified into a second category, shown as classification probabilities ("dog",0.993|"cat",0.007).

The multi-channel output activation map 412 generated by the final convolution block 124a are shown as the output (i.e. output activation maps) of the ReLU layer 128. The multi-channel output activation map 412 may be used to generate explanations of the CNN 400, as described below with reference to FIGS. 5-10.

In some embodiments, a model structure other than a CNN may be used. The model structure may be any neural network trained using machine learning and implemented by a computational structure or algorithm, as long as the neural network takes a numerical input (e.g., sets of pixel values of an image) and returns activation maps corresponding to extracted features of the data sample used as input.

Example methods of neural network explanation will now be described with reference to FIGS. 5-6, and example methods of neural network explanation will be described with reference to FIGS. 7-10.

Example Representations of Inference Basis and Context

Figure 5:
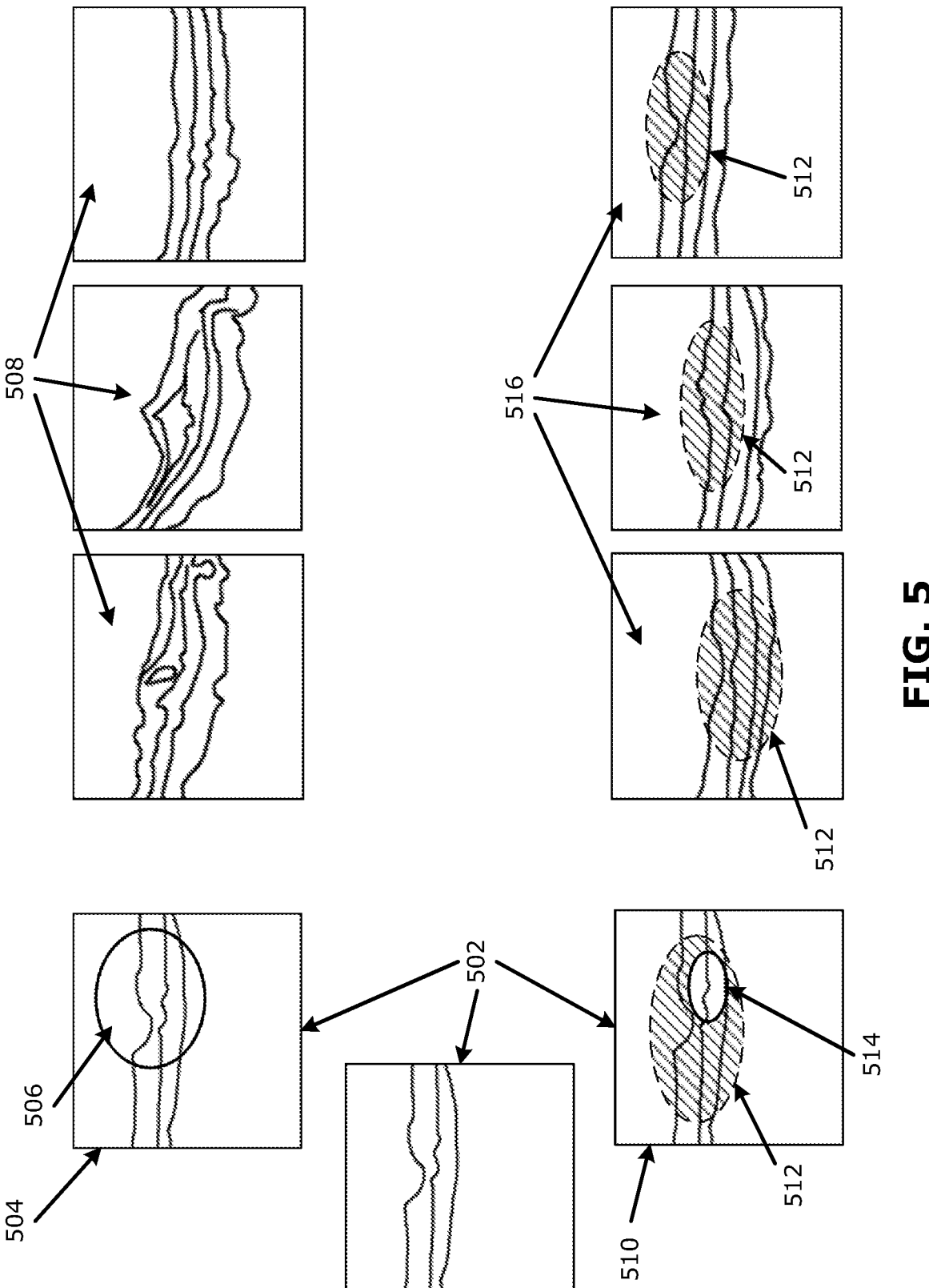
FIG. 5 is a set of medical images including a positive data sample, a conventional human perceptible representation of the inference basis applied to the positive data sample along with several randomly selected negative samples, a human perceptible representation of the positive data sample with the inference context and inference basis applied to it in accordance with the present disclosure, and human perceptible representations of the inference context applied to several likely alternative data samples generated in accordance with the present disclosure.

FIG. 5 shows a set of medical images, such as CT scan images of healthy and diseased human retinas. The images shown in FIG. 5 may be processed by a trained neural network (such as CNN 400) to perform a binary inference task, e.g., classification of each retina image as "diseased" or "healthy". A positive (i.e. diseased) data sample 502, as classified by the trained neural network, is shown on the left. The top row of FIG. 5 shows images generated in a conventional approach to neural network explanation. The positive data sample 502 is shown again at the top left, with a human perceptible representation of the inference basis 506 applied to it, thereby forming image 504. The human perceptible representation of the inference basis 506 may be a visual indication, such as a heatmap, discoloration, or border, which indicates a pixel region of the positive data sample 502 exhibiting features that are highly salient to the binary inference result generated (e.g., classification data 414) generated by the trained neural network (e.g., CNN 400). Three additional negative data samples 508 (i.e., data samples resulting in a negative inference, i.e. "healthy", when processed by the trained neural network) are also shown along the top row of FIG. 5. However, these negative data samples 508 are randomly selected from a data set, as conventional approaches to neural network explanation typically have no mechanism for selecting relevant or helpful negative samples from a data set as part of an explanation.

FIG. 5 also shows, along its bottom row, images generated by example neural network explanation methods as described herein. The positive data sample 502 is shown at the bottom left, with a human perceptible representation of the inference context 512 applied to it, and a human perceptible representation of the inference basis (within the inference context) 514 applied to it, thereby forming image 510. In addition, the bottom row of FIG. 5 shows human perceptible representations of the inference context 512 applied to several likely alternative data samples 516 automatically selected from a data set using the example methods described herein. Each likely alternative data sample 516 represents a data sample selected from the data set (e.g., data set 114) sharing with the positive data sample 502 the common features defining the inference context 512, but not sharing with the positive data sample 502 the discriminative features defining the inference basis 514.

Figure 6:
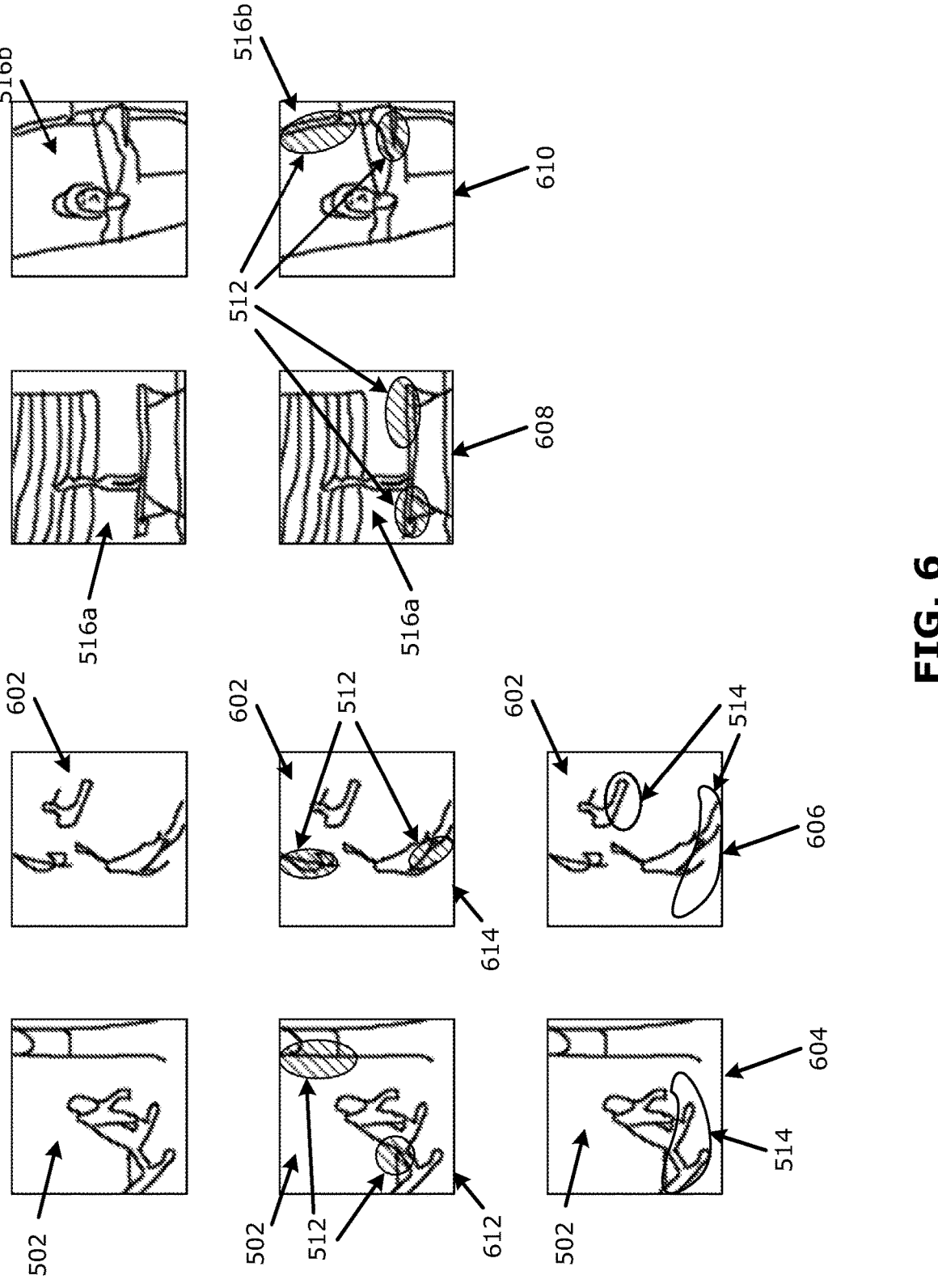
FIG. 6 is a set of sporting event images generated in accordance with the present disclosure, including a positive data sample, a similar data sample, two likely alternative data samples, human perceptible representations of the positive data sample, similar data sample, and likely alternative data samples with the inference context applied to them, and human perceptible representations of the positive data sample and similar data sample with the inference basis applied to them.

FIG. 6 shows a set of sporting event images constituting an explanation of an inference basis of a neural network in performing a binary inference task, generated in accordance with examples disclosed herein. In this example, the neural network has been trained to perform a classification task classifying images according to which sport they depict. The binary inference task being explained is the classification of data samples into the class "skiing" (i.e., a positive result) or into another class (i.e., a negative result).

The top row of images in FIG. 6 shows data samples without any explanation applied to them. A positive data sample 502 (i.e., a data sample associated with a positive inference by the trained neural network, i.e. classification into the class "skiing") is shown at the top left, showing an image of a person skiing (and also showing a flag planted in the ski hill). A similar data sample 602 (i.e., another data sample associated with a positive inference) is shown to the right of the positive data sample 502, showing two people skiing (and also showing a flag planted in the ski hill). Two likely alternative data samples 516a, 516b (i.e., data samples associated with a negative inference) are shown to the right of the similar data sample 602: the first likely alternative data sample 516a shows a person performing on a balance beam, and the second likely alternative data sample 516b shows a person performing archery. Examples described herein are capable of automatically selecting the similar data sample 602 and the likely alternative data samples 516a, 516b from a data set of data samples such that all four data samples share a common set of contextual features (i.e., an inference context), and the positive data sample 502 and similar data sample 602 share a set of discriminative features (i.e., an inference basis) that distinguish them from the negative inference result of the likely alternative data samples 516a, 516b within the constraints of the inference context.

The second row of images 612, 614, 608, 610 of FIG. 6 shows the four data samples 502, 602, 516a, 516b of the top row with a human perceptible representation of their shared inference context 512 applied to them. As in FIG. 5, the human perceptible representation may be shown as a visual indicator (e.g., a heatmap, a discoloration, or a border) of pixel regions of the image that exhibit the contextual features. In this example, the inference context appears to be a feature corresponding to long, thin, straight objects visible in the image. Thus, the human perceptible representation of the inference context 512 is visible in the positive data sample 502 and the similar data sample 602 around pixel regions showing flag poles and ski poles, whereas in the first likely alternative data sample 516a it is visible around pixel regions showing portions of a balance beam, and in the second likely alternative data sample 516b it is visible around pixel regions showing the upper vertical portion of a bow and a horizontal stabilizer of a bow.

The third row of images 604, 606 of FIG. 6 shows only the positive data sample 502 and the similar data sample 602, with a human perceptible representation of their shared inference basis 514 applied to them. As in the second row, the human perceptible representation may be shown as a visual indicator (e.g., a heatmap, a discoloration, or a border) of pixel regions of the image that exhibit the contextual features. In this example, the inference basis (i.e., the set of discriminative features that distinguish a positive inference from a negative inference within the inference context) appears to be a feature corresponding to skis visible in the image. Thus, the human perceptible representation of the inference basis 514 is visible in the positive data sample 502 and the similar data sample 602 around pixel regions showing skis.

In this example, each image in the second and third row is generated by combining the respective data sample (e.g., 502) with a heatmap or other human perceptible representation of an inference context or an inference basis generated by the neural network explanation method 700 of FIG. 7 below. The human perceptible representation is combined with its respective data sample (e.g., 502) to yield a human-understandable representation showing the original data sample 502 modulated, perturbed, overlaid, superimposed, or otherwise combined with its respective heatmap or other human perceptible representation. For example, a heatmap may re-color the positive data sample 502 such that pixel regions having a high heat level as defined by the heatmap are red-shifted whereas pixel regions having a low heat level as defined by the heatmap are blue-shifted or left unmodified. In some embodiments, the heatmap may recolor or color-shift multiple pixel regions using multiple colors in a spectrum, such as a first color (e.g., red) for very-high-heat regions, a second color (e.g., orange) for high-heat regions, and a third color (e.g., yellow) for moderate-heat regions, leaving low-heat regions unmodified. Continuous color values may be used in some embodiments to represent continuous heatmap values.

The generation of the heatmaps and other human perceptible representations is described in detail below with reference to FIGS. 7-10. In summary, the heatmaps or other human perceptible representations indicate pixel regions of a data sample that are highly relevant or salient to a given inference basis or inference context.

Example Method for Explanation of an Inference Basis of a Neural Network

FIG. 7 is a flowchart of an example method 700 for explaining the inference basis of a neural network trained to perform a binary inference task, as described above. In this example, the method 700 will be described in the context of the CNN 400 of FIG. 4. However, it will be appreciated that other CNNs, DNNs, other neural network configurations, or other model types could be explained using the techniques described herein with suitable modifications.

Method 700 begins at step 702 by obtaining a trained neural network. As described above, the neural network may be a CNN 400 trained to perform a binary inference task. The trained neural network may be obtained by training the neural network using a training dataset, by obtaining a pre-trained neural network, or by obtaining a partially trained neural network and competing the training using additional training data, e.g., by performing fine-tuning of the parameter values of the neural network.

At 704, a data set 114 is obtained. The data set 114 contains multiple data samples, including a negative data subset and a positive data subset. The negative data subset includes multiple negative data samples, i.e., data samples associated with a negative result of the binary inference task performed by the trained neural network. The positive data subset includes multiple negative data samples, i.e., data samples associated with a positive result of the binary inference task performed by the trained neural network.

In some examples, the data set 114 may be the training dataset that was used to train the neural network. In some examples, the associations between the positive data samples and the positive inference result of the trained neutral network, and between the negative data samples and the negative inference result of the trained neutral network, may be pre-generated (e.g., during a final training epoch using the data set 114 to train the neural network). In other examples, the associations may be generated after the trained neural network and data set 114 are obtained. In some examples, the associations are generated on an as-needed basis while performing the method 700.

At 706, a Binary Feature Generation operation is performed to generate relationships between features and data samples. In general terms, the data samples of the data set 114 are processed by the trained neural network, and features are extracted from the multi-channel output activation map 412 generated by final convolution layer 126a. For each channel of the multi-channel output activation map 412, the data samples exhibiting the highest levels of activation are selected from the data set 114 such that the selected data samples become associated with the feature corresponding to that channel, and all other data samples are not associated with that feature. This binarization process (i.e., making binary determinations of whether a given data sample is or is not associated with a given feature) allows the encoding of relationships between data samples and features using a transaction table of (data sample, feature) pairs, thereby enabling the identification of data samples that share similar features.

Therefore, in some examples, the Binary Feature Generation step 706 involves processing the data set 114, using the trained neural network, to generate a set of relationships between features and data samples. In some examples, the set of relationships is encoded as a transaction table. The set of relationships identifies, for each feature of a plurality of features, one or more data samples of the data set 114 associated with the feature. Further details of an example Binary Feature Generation step 706 are provided below with reference to FIG. 8.

At 708, one or more Contextual Discriminative Patterns (CDPs) are formulated by processing the set of relationships generated at step 706 to generate at least one CDP. Each CDP is formulated such that it identifies an inference context and an inference basis. The inference context consists of one or more contextual features that are all associated (according to the set of relationships generated at step 706) with a first set of multiple negative data samples and second set of multiple positive data samples from the data set 114. The inference basis consists of one or more discriminative features that are all associated (according to the set of relationships generated at step 706) with many positive data samples from the second set and few negative data samples from the first set, such that the inference basis is more highly associated with the second set than with the first set.

In some examples, the inference context of a CDP is associated with as many data samples as possible. The number of data samples associated with the set of contextual features defining an inference context of a CDP is referred to herein as the "coverage" of the inference context. Some examples described herein formulate CDPs such that their inference contexts have maximal coverage.

In some examples, the inference basis of a CDP is highly discriminative between positive inferences and negative inferences of the trained neural network with respect to data samples sharing the inference context. The degree of discriminativeness of the set of discriminative features defining an inference basis of a CDP is referred to herein as the "discriminativeness" or "discriminativeness value" of the inference basis. Some examples described herein formulate CDPs such that their inference bases have a discriminativeness value, within the CDP's inference context, that satisfies (i.e., is higher than) a discriminativeness threshold.

A first example CDP formulation operation is described with reference to FIG. 9A below. A second example CDP formulation operation, using an efficient CDP mining algorithm, is described with reference to FIG. 9B below.

At 710, a Contextual Discriminative Explanation is generated by processing a data sample being used for the explanation, the CDP(s) generated at step 708, and the data set 114 to generate explanations of the inference context and the inference basis for the inference task performed by the trained neural network. In some examples, the Contextual Discriminative Explanation may include one or more of the image types shown in FIG. 6 or in the bottom row of FIG. 5: i.e., data samples, including the input image (e.g., positive data sample 502) and one or more similar data samples 602 and/or likely alternative data samples 516 automatically selected from the data set 114, one or more of the data samples potentially having applied to it a human perceptible representation of the inference context 512 and/or inference basis 514.

An example Contextual Discriminative Explanation operation is described below with reference to FIG. 10.

Example Binary Feature Generation Method

FIG. 8 is a flowchart of an example method for performing the binary feature generation step 706 of method 700.

The Binary Feature Generation Module step 706 processes the trained neural network and the data set 114 to generate several outputs. First, a cutoff threshold (also called an activation threshold) is computed for each channel. In some embodiments, the set of activation thresholds may be represented as a vector of real numbers containing one threshold for each channel of the multi-channel activation map. Second, a set of binary relationships between features and data samples is generated. In some examples, the set of relationships may be represented as a matrix of binary values wherein each row corresponds to a data sample in the data set 114 and each column corresponds to a channel of the multi-channel output activation map 412. In some examples described herein, the set of relationships may be referred to as a transaction table, wherein each data sample has "purchased" a subset of the features (i.e. the subset of channels associated with the data sample) in a "transaction".

The description of the example Binary Feature Generation step 706 uses the following terminology:

x is an arbitrary data sample selected from the data set 114.

$T_x$ is the binary feature vector for data sample x.

D is the data set 114.

F is the neural network or other model. The output is the logits 416.

$F_{trunc}$ is the model truncated after the final convolutional layer 126a.

$F_{tail}$ is the tail of F; that is, the layers remaining after truncation.

K is the number of channels of the multi-channel output activation map 412 generated by the final convolutional layer 126a.

L is the edge size (e.g., height and width) of the multi-channel output activation map 412, which can be regarded as the output of $F_{trunc}$. Therefore, the output of $F_{trunc}$ ill be a K×L×L tensor.

α is the cutoff percentile used to compute the activation threshold. α is typically large: in some embodiments, e.g., α=99.9.

$(t_1, t_2, \ldots, t_K)$ is the vector of K activation thresholds.

In some embodiments, a is a parameter whose value is defined by a user.

The example Binary Feature Generation step 706 of FIG. 8 begins at step 802. At 802, each data sample of the data set 114 is processed by the trained neural network (e.g., CNN 400) to generate a respective multi-channel output activation map 412 of the final convolution layer 126*a*. For all data samples x∈D, the CNN 400 computes $F_{trunc}(x)$ (i.e. the multi-channel output activation map 412), which will be a K×L×L tensor.

In some examples, the multi-channel output activation map 412 for each data sample is pre-computed. For example, in some embodiments in which the data set 114 is the training dataset, the multi-channel output activation map 412 generated during a final training epoch may be stored in the memory 110 in association with an identifier for each data sample, potentially along with a final inference result (e.g., prediction data 414) associated each data sample.

At 804, an activation threshold (i.e. the cutoff threshold) for each channel of the multi-channel output activation map 412 is computed. First, for each of the K output channels of $F_{trunc}$ (the multi-channel output activation map 412), there are |D| (i.e. the number of data samples in the data set 114) feature maps of dimension L×L. This yields $L^2|D|$ activation values in total. Second, the α-th percentile of these $L^2|D|$ activation values is computed. Doing this for each channel generates a vector of activation thresholds $(t_1, t_2, \ldots, t_K)$. This is the set of activation thresholds.

At 806, for each channel, the data samples of the data set 114 that generate an activation map 412 having at least one activation value above the activation threshold are identified. For each data sample x∈D, x receives a value 1 at the k-th channel (i.e. the data sample becomes associated with the k-th feature) if any of the $L^2$ values in the corresponding activation map is greater than the corresponding activation threshold $t_k$. Otherwise, x receives a value of 0 (i.e. the data sample is not associated with the k-th feature).

At 808, the values generated for each data sample in relation to the current channel are assembled to generate a set of relationships including an association between the current feature and the data samples having a "1" value in relation to the current feature. This generates, for the current channel, a binary vector $T_x$ containing a binary value for each data sample x in the data set 114.

At 810, if there are more features (i.e. channels) to be processed, the Binary Feature Generation operation returns to step 808 to generate the relationships between the next feature and the data samples. After the last feature has been processed, the Binary Feature Generation operation proceeds to step 708 of method 700. Collectively, the set of K features results in a |D|×K binary matrix. This is the set of relationships between data samples and features.

In examples described herein, the activation threshold is generated by identifying an activation threshold value effective to identify a predetermined proportion (e.g., (100−α) percent) of the data samples of the data set 114 as the data samples satisfying the activation threshold. It will be appreciated that, in some embodiments, the activation threshold may be computed in other ways, for example by choosing a predetermined fixed number of data samples having the highest activation values.

Example CDP Formulation Method

Figure 9A:
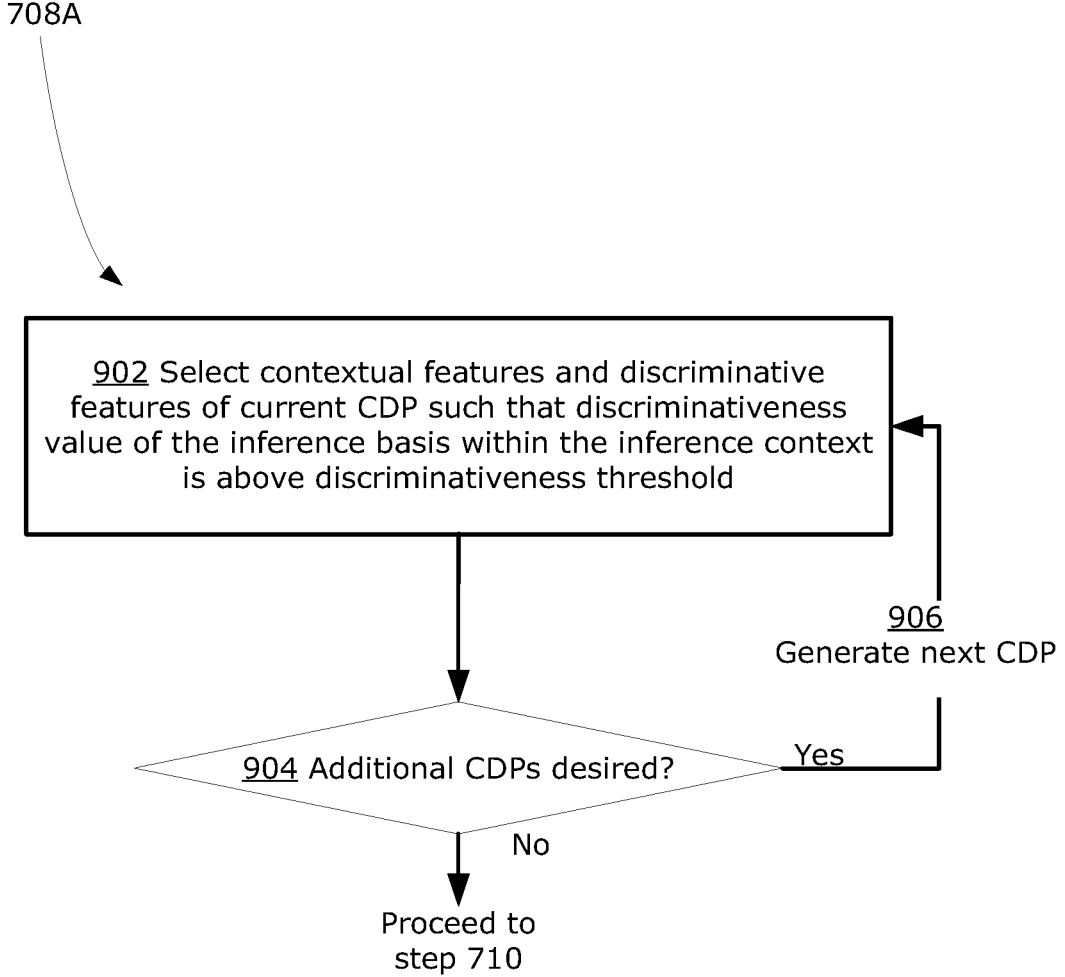
FIG. 9A is a flowchart of a first example method for performing the CDP generation step of the method of FIG. 7.
Figure 9B:
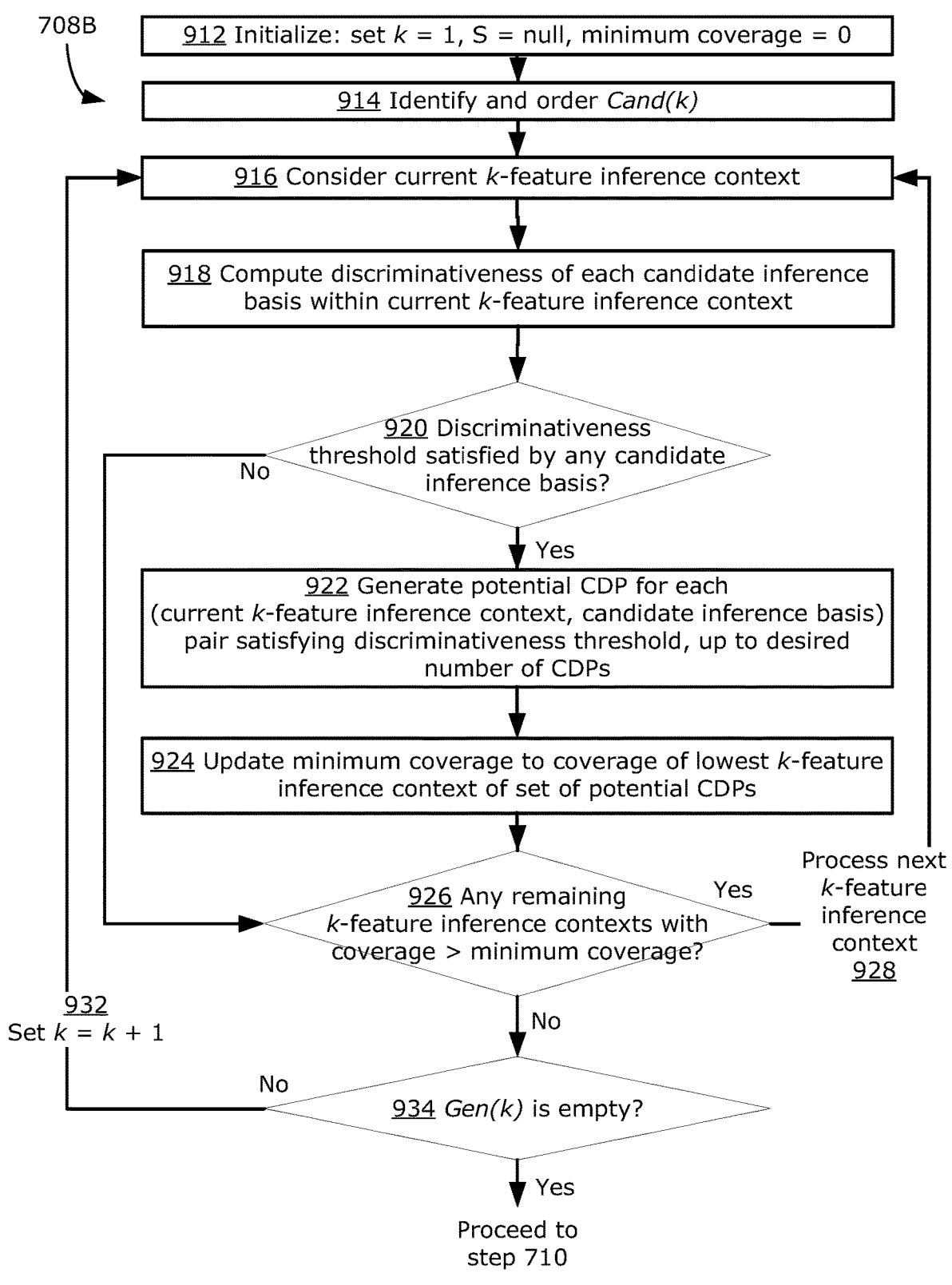
FIG. 9B is a flowchart of a second example method for performing the CDP generation step of the method of FIG. 7 using a CDP mining algorithm.

FIG. 9A is a flowchart of a first example method 708A for performing the CDP generation step 708 of method 700. The example method shown in FIG. 9A is described in general terms with reference to a set of goals for formulating CDPs to be used in explaining inference behavior of the neural network. FIG. 9B provides a much more detailed mining algorithm for efficiently identifying CDPs that satisfy these criteria.

The method of FIG. 9A begins at step 902. At 902, the contextual features and discriminative features of a current CDP are selected such that a discriminativeness value of the inference basis, within the inference context, is above a discriminativeness threshold.

At 904, if additional CDPs are desired, the method 708A proceeds to step 906 to generate an additional CDP at step 902. If no additional CDPS are desired upon reaching step 904, the method 708A proceeds to step 710 of method 700.

In some embodiments, the inference context includes one or more contextual features selected from the features of the multi-channel output activation map 412. The contextual features of the inference context are all associated with a first set of negative data samples and a second set of positive data samples from the data set 114. The inference basis includes one or more discriminative features selected from the features of the multi-channel output activation map 412. The discriminative features of the inference basis are more highly associated with the second set of positive data samples than with the first set of negative data samples. Thus, within the constraints of the inference context, the inference basis discriminates at least somewhat between positive and negative samples.

In some examples, a first CDP is formulated by selecting, from the K features, the contextual features and the discriminative features such that a discriminativeness value of the inference basis within the inference context is above a discriminativeness threshold. The discriminativeness threshold may be defined as described below with reference to FIG. 9B.

In some examples, the discriminativeness value of the inference basis within the inference context is computed as a difference between two ratios. The first ratio is computed as a ratio between a first number and a second number. The first number indicates how many data samples in the positive data subset are associated with both the one or more discriminative features and the one or more contextual features. The second number indicates how many data samples in the positive data subset are associated with the one or more contextual features. The second ratio is between a third number and a fourth number. The third number indicates how many data samples in the negative data subset are associated with both the one or more discriminative features and the one or more contextual features. The fourth number indicates how many data samples in the negative data subset are associated with the one or more contextual features.

In some examples, the CDPs are generated to maximize coverage of their inference contexts. For each of multiple candidate CDPs, a respective coverage value of the contextual features is computed. The CDPs to be retained and used are then selected from the candidate CDPs by selecting at least one CDP having a coverage value above a coverage threshold. In some examples, as described below with reference to FIG. 9B, the coverage threshold (i.e. minimum coverage) is redefined as CDPs are identified having successively greater coverage.

In some examples, the coverage value of a CDP is computed by computing the second number (from the discriminativeness threshold described above) indicating how many data samples in the positive data subset are associated with the one or more contextual features of the CDP, and computing the fourth number (from the discriminativeness threshold described above) indicating how many data samples in the negative data subset are associated with the one or more contextual features of the CDP. The coverage value is then computed as the lower of the second number and the fourth number.

Example Efficient CDP Mining Method

FIG. 9B is a flowchart of a second example method 708B for performing the CDP generation step 708 of method 700 using a CDP mining algorithm. It will be appreciated that the CDP mining algorithm shown in FIG. 9B is a more detailed implementation of how to generate CDPs consistent with the requirements described above with reference to FIG. 9A.

The CDP Mining step 708B processes a number of inputs in various embodiments, including the trained neural network, a data sample to be used for explanation (e.g., positive data sample 502), the data set 114, the set of relationships generated at step 706, the set of activation thresholds generated at step 706, a discriminativeness threshold, and/or a number of CDPs desired, to generate one or more CDPs. In some examples, the discriminativeness threshold is defined by a user. In some examples, the number of CDPs desired is defined by a user.

A CDP is a pair of the form (p, q) wherein p and q are a subset of channels. Specifically, p is the set of channels (i.e. features) defining the inference context of the CDP, and q is the set of channels (i.e. features) defining the inference basis of the CDP.

The description of the example CDP Mining step 708B uses the following terminology:

x is the data sample to be used for explanation.

$T_x$ is the subset of features associated with x, i.e. a subset of features/channels {1, 2, . . . , K}.

$D^+$ is the set of positive data samples in the data set 114 (i.e., the positive data subset).

$D^-$ is the set of negative data samples in the data set 114 (i.e., the negative data subset).

D(•) is the set of data samples in the data set D 114 that are associated with the features identified in the parentheses.

$(t_1, t_2, . . . , t_K)$ are the activation thresholds.

$Perm(T_x)$ are the permissible channels from $T_x$.

Cand(k) is the set of candidates of length k.

Gen(k) is the set of generators of length k.

p, q, T are subset of channels with properties to be specified below.

power( ) is the power set operation.

Q is the solution of a Frequent Pattern Mining (FPM) Problem.

S is the set of mined patterns.

disc(p, q) is the discriminativeness of the pattern (p, q).

cov(p) is the coverage of p.

mincov(S) is the minimum coverage over all patterns in S.

δ is the discriminativeness threshold, e.g., provided by the user.

N is the desired number of CDPs to be mined, e.g., provided by the user.

In some examples, example CDP Mining operation 708B outputs the top N contextual discriminative patterns (p, q) with the largest coverage.

The CDP Mining operation assumes that the system has been initialized: specifically, the data samples of the data set 114 have been processed by the trained neural network to associate positive data samples with a positive inference and negative data samples with a negative inference, and the multi-channel output activation maps 412 have been generated and stored for each data sample in the data set 114, as described above. Thus, in some examples, the CDP Mining operation may include an initialization stage before the steps shown in FIG. 9B. During initialization, the computing system executes the instructions 112 to find all data samples in the data set 114 that have the same predicted label as x. I.e., if data sample x is positive data sample 502, then all positive data samples in the data set 114 are identified and associated with a positive inference, thereby forming the positive data subset $D^+$. All other data samples in the data set 114 are deemed to be negative data samples forming the negative data subset $D^-$.

Also during initialization, if the data sample x to be used for the explanation was not included in the data used to generate the set of binary feature relationships at step 706, then x is forward-propagated through (i.e., processed by) the CNN 400 to generate the multi-channel output activation map 412 for x using the activation threshold vector $(t_1, t_2, . . . , t_K)$. The set of channels satisfying the thresholds are identified and used to generate the binary vector $T_x$ of features associated with x.

The problem to be solved by the CDP Mining operation 708B can be formulated as follows. First, the discriminativeness of (p, q) is defined as $$disc(p, q) = \frac{|D^+(p \cup q)|}{|D^+(p)|} - \frac{|D^-(p \cup q)|}{|D^-(p)|}.$$

Second, the coverage of p is defined by $cov(p) = min\{|D^+(p)|, |D^-(p)|\}$. Third, the problem to be solved is to find the top N pairs of (p, q) with the largest coverage such that $disc(p, q) \geq \delta$. It is also required that both p, $q \subseteq T_x$ wherein $T_x$ is a subset of the channels.

The mining operation begins at 912. At 912, a further initialization step is performed for the variables used in mining. This initialization step 912 may include, or may be in addition to, the initialization operation described above in some embodiments. At 912, the following variables are initialized: the set of mined CDPs $S = \phi$ (i.e. a null set) and candidate length $k = 1$. Therefore $mincov(S) = 0$ at this point.

The operation first mines for CDP candidates within the set of inference context candidates having exactly k features, Cand(k). Each candidate inference context in Cand(k) may be referred to as a k-feature inference context, a k-feature inference context candidate, or a k-feature candidate inference context.

At step 914, the elements of Cand(k) are identified and optionally ordered. The details of step 914 depend on the value of k. If $k = 1$, then Cand(1) is simply the set of one-element subsets of $T_x$. The single elements of Cand(1) can be ordered in decreasing order by coverage. In some examples, the permissible channels $Perm(T_x)$ are initialized to $Perm(T_x) = Cand(1)$, and the coverage of each of its element is saved (e.g., in memory 110). Alternatively, if $k > 1$ at step 914, the set of candidate inference contexts Cand(k) can be generated from the set of generators Gen(k−1) using the classical Apriori algorithm. In some examples, the candidates can be ordered simply in the order the candidates are generated, or in any other order.

For each candidate inference context p∈ Gen(k), steps 916 through 926 are performed.

At 916, the current k-feature candidate inference context is considered. At steps 916 through 924, a search is performed for an inference basis q within the fixed inference context p, i.e., the current k-feature candidate inference context being considered.

At 918, the discriminativeness of each candidate inference basis q within current inference context p is computed. At 920, any candidate inference bases satisfying the discriminativeness threshold within the inference context are identified. Steps 918 and 920 may be jointly performed as follows in some embodiments. First, the set T of channels is identified that is common to (i.e. associated with) all positive data samples associated with the current inference context, $D^+(p)$. Second, the Frequent Pattern Mining (FPM) Problem is solved in $D^+(p)$ with items $T_x\backslash(p\cup T)$ and discriminativeness threshold δ. The set of solutions is denoted by Q. All pairs {(p, q∪t)|q∈ Q, t∈ power(T)} are then found that satisfy the discriminativeness requirement disc(p, q∪t)≥δ.

At 920, if there are no solutions for inference basis q, then the current k-feature inference context candidate is skipped, and the method proceeds to step 926. Otherwise, if at least one solution for inference basis q is found, the method proceeds to step 922.

At 922, potential CDPs are generated based on the newly identified solutions and added to the set S of potential CDPs, up to the maximum number N of desired CDPs. If there are some solutions for q, the newly identified solution(s) (p, q) are added to the existing solutions in S such that S now includes the newly identified solution(s) (p, q). S is then processed to find the new top N solutions, i.e., the N solutions having the highest coverage for their inference contexts. If the updated S still has fewer than N solutions, then the minimum coverage does not change, mincov(S)=0.

Otherwise, at step 924, mincov(S) is updated by finding the new minimum coverage, i.e., the lowest coverage value of any of the top N solutions, i.e., $$\text{mincov}(S) = \min_{(p,q)\in S} \text{cov}(p).$$

If mincov(S) is increased, all elements are also removed from Perm($T_x$) whose coverage is less than the new mincov (S).

This is the end of the processing of the current k-feature candidate inference context p. Any solutions (i.e., potential CDPs) have been identified and added to set S, and set S has been updated along with mincov(S) and Perm($T_x$). The method now proceeds to step 926 to consider additional candidate inference contexts.

At 926, the next k-feature candidate inference context p is checked for two conditions: first, that all elements of p are in the set of permissible features Perm($T_x$), and second, that the coverage of the candidate inference context p is at least as great as the current minimum coverage, cov(p)≥mincov (S). If either of these condition does not hold, the candidate p is skipped, and the next candidate that meets these criteria is checked. Thus, step 926 includes computation of the coverage for the potential next candidate inference context to be considered. If no remaining candidates are found within the set Cand(k) of k-feature candidate inference contexts, the method proceeds to step 934. Otherwise, the next candidate satisfying both conditions is passed to step 928. At 928, the candidate satisfying both conditions is processed beginning at step 916.

At 934, the entire set Cand(k) of k-feature candidate inference contexts has been considered. Gen(k) is defined as the set of elements in p E Cand(k) such that cov(p)≥mincov (S). If Gen(k) is empty, the method proceeds to step 710. Otherwise, the method proceeds to step 932.

At 932, the value of k is increased by 1, and the method returns to step 916 to consider the set of candidate inference contexts having the newly incremented number k of features. Thus, after all 1-feature inference contexts have been considered, the next loop after step 932 will begin considering all 2-feature inference contexts.

If Gen(k) is empty at step 934, i.e., after all candidate inference contexts of any length have been considered, the final set S is the final set of CDPs used at step 710 of method 700, as described below.

Example Contextual Discriminative Explanation Method

FIG. 10 is a flowchart of an example method for performing the Contextual Discriminative Explanation generation step 710 of method 700.

The Contextual Discriminative Explanation generation step 710 processes a number of inputs in various embodiments, including the trained neural network, a data sample to be used for explanation (e.g., positive data sample 502), the data set 114, the set of relationships generated at step 706, and/or the final set of CDPs generated at step 708, to generate a human perceptible and human understandable explanation of the inference basis of the trained neural network.

The description of the example Contextual Discriminative Explanation generation step 710 uses the following terminology:

x is the data sample to be used for explanation.

$F_{trunc}(x)=(x_{i,j,k})$ is the multi-channel output activation map 412 of x. i and j denote the spatial location and k denotes the channel.

$(a_{i,j})$ is an attribution map that describes feature importance.

(p, q) is a Contextual Discriminative Pattern (CDP).

$D^+$ is the set of positive data samples in the data set 114, i.e., the positive data subset.

$D^-$ is the set of negative data samples in the data set 114, i.e., the negative data subset.

D(•) is the set of data samples in the data set D 114 that are associated with the features identified in the parentheses.

The example Contextual Discriminative Explanation generation step 710 begins at step 1002. At 1002, a CDP is selected from the set of CDPs. The selected CDP necessarily has contextual features and discriminative features that are all associated with the data sample x to be used for the explanation, due to the formulation of the CDPs at step 708A or 708B. The data sample x to be used for the explanation will be referred to herein as positive data sample 502; however, it will be appreciated that a negative data sample may be used instead, with the logic inverted accordingly. The positive data sample 502 and the selected CDP are processed to determine the inference context and inference basis for positive data sample 502: i.e., the inference context (i.e., the contextual features) and the inference basis (i.e., the discriminative features) of the CDP.

At 1004, the data set 114 and the selected CDP are processed to generate one or more similar data samples 602 sharing the inference context and the inference basis with the positive data sample 502. I.e., each similar data sample is a positive data sample selected from the positive data subset, and is associated with all of the contextual features and all of the discriminative features of the selected CDP.

At 1006, the data set 114 and the selected CDP are processed to generate one or more likely alternative data samples 516 sharing the inference context but not the inference basis with the positive data sample 502. I.e., each likely alternative data sample 516 is a negative data sample selected from the negative data subset, and is associated with all of the contextual features and few or none (as defined by the discriminativeness threshold δ) of the discriminative features of the selected CDP.

In some examples, steps 1004 and 1006 are performed as follows. First, let p be the inference context of the selected CDP. Second, the method finds D(p), which is the set of data samples in the data set 114 such that their corresponding binary feature, when regarded as a subset of channels, contain p. This may be determined based on the set of relationships generated at binary feature generation step 706. Third, the set of similar data samples 602 are the data samples in D(p) that have the same predicted label as x, i.e., if x is positive data sample 502, then the similar data samples 602 are positive data samples as well. Fourth, the set of likely alternative data samples 516 are the data samples in D(p) that do not have the same predicted label as x, i.e., if x is positive data sample 502, then the likely alternative data samples 516 are negative data samples.

At 1008, a human perceptible representation of the inference context 512 is generated and applied to the positive data sample 502 to generate an image or other human perceptible representation such as the image 612 at the left end of the second row of FIG. 6.

At 1010, a human perceptible representation of inference basis 514 is generated and applied to the positive data sample 502 to generate an image or other human perceptible representation such as the image 604 at the left end of the third row of FIG. 6.

At 1012, a human perceptible representation of the inference context 512 is generated and applied to the likely alternative data samples 516 to generate images or other human perceptible representations such as the images 608, 610 at the right side of the second row of FIG. 6.

At 1014, a human perceptible representation of the inference basis 514 is generated and applied to the similar data samples 602 to generate an image or other human perceptible representation such as the image 606 second from the left of the third row of FIG. 6.

At 1016, a human perceptible representation of the inference context 512 is generated and applied to the similar data samples 602 to generate an image or other human perceptible representation such as the image 614 second from the left of the second row of FIG. 6.

Thus, steps 1008, 1012, and 1016 involve the generation and application of a human perceptible representation of the inference context 512. In some examples, the inference context is visualized and applied to an image as follows. First, for any image x on which the common (i.e. contextual) features are to be visualized, $a_{i,j}=\Sigma_{k\in p}x_{i,j,k}$ is computed, which yields a L×L matrix. Intuitively, the larger the value of $a_{i,j}$, the more important that region is.

Second, $(a_{i,j})$ is normalized to [0,1] and then rescaled to the original image dimensions. This mask can now be visualized in many ways (e.g. overlay on the original image as a heatmap), and it describes the location of the contextual features (i.e., the pixels with higher values).

It will be appreciated that, whereas the two steps above are typically only performed for an data sample x in D(p), as they are supposed to share the contextual features, mathematically the two steps can be done for any instance.

Similarly, steps 1010 and 1014 involve the generation and application of a human perceptible representation of the inference basis 514. In some examples, the inference basis is visualized and applied to an image as follows. First, for any image x on which the discriminative features are to be visualized, $a_{i,j}=\Sigma_{k\in p}x_{i,j,k}$ is computed, which yields a L×L matrix. Intuitively, the larger the value of $a_{i,j}$, the more important that region is.

Second, $(a_{i,j})$ is normalized to [0,1] and then rescaled to the original image dimensions. This mask can now be visualized in many ways (e.g. overlay on the original image as a heatmap), and it describes the location of the discriminative features (i.e., the pixels with higher values).

It will be appreciated that, whereas the two steps above are typically only performed for a data sample x in $D^+(p)$, as they are supposed to share the discriminative features, mathematically the two steps can be done for any instance.

In some examples, additional CDPs may be selected from the set of CDPs and used to generate additional explanations of the inference basis of the neural network.

In some embodiments, a single human-perceptible representation of the inference basis and/or the inference context may be generated based on an combination of more than one heatmap. It will be appreciated that there are many ways to summarize multiple heatmaps into one.

It will be appreciated that, once a CDP has been identified at step 708, there are many ways to explain the inference behavior of the neural network using the contextual features and discriminative features of the CDP. Thus, some embodiments may omit step 710 or replace step 710 with other explanatory techniques.

General

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The content of all published papers identified in this disclosure, are incorporated herein by reference.

Further aspects and examples of the present disclosure are presented in the Appendix attached hereto, the entirety of which is hereby incorporated into the present disclosure.

The invention claimed is:

1. A method for explaining a basis for a binary inference task performed by a neural network trained to perform the binary inference task, comprising:

obtaining a data set comprising a plurality of data samples, the plurality of data samples comprising:

a negative data subset comprising a plurality of negative data samples associated with a negative result of the binary inference task performed by the trained neural network; and a positive data subset comprising a plurality of positive data samples associated with a positive result of the binary inference task performed by the trained neural network;

processing the data set, using the trained neural network, to generate a set of relationships between features and data samples, the set of relationships identifying, for each feature of a plurality of features, one or more data samples of the data set associated with the feature; and processing the set of relationships to generate at least one contextual discriminative pattern (CDP), each CDP identifying:

an inference context comprising one or more contextual features of the plurality of features, the inference context being associated with a first plurality of negative data samples of the negative data subset and a second plurality of positive data samples of the positive data subset; and an inference basis comprising one or more discriminative features of the plurality of features, wherein processing the set of relationships to generate at least one CDP comprises:

selecting, from the plurality of features, the one or more contextual features of a first CDP and the one or more discriminative features of the first CDP such that a discriminativeness value of the inference basis within the inference context is above a discriminativeness threshold, wherein the discriminativeness value of the inference basis within the inference context is computed as a difference between:

a first ratio between:

a first number indicating how many data samples in the positive data subset are associated with both the one or more discriminative features and the one or more contextual features; and a second number indicating how many data samples in the positive data subset are associated with the one or more contextual features; and a second ratio between:

a third number indicating how many data samples in the negative data subset are associated with both the one or more discriminative features and the one or more contextual features; and a fourth number indicating how many data samples in the negative data subset are associated with the one or more contextual features, wherein the inference basis is associated with the second plurality of positive data samples and the first plurality of negative data samples such that the first ratio is greater than the second ratio.

2. The method of claim 1, further comprising:

obtaining an input data sample to be explained;

processing the input data sample using the trained neural network to determine that the input sample is associated with the positive result of the binary inference task;

processing the input data sample and the at least one CDP to determine that the input sample is associated with:

the inference context of the first CDP of the at least one CDP; and the inference basis of the first CDP; and processing the data set and the first CDP to generate:

one or more similar data samples sharing the inference context and the inference basis with the input data sample; and one or more alternative data samples sharing the inference context but not the inference basis with the input data sample.

3. The method of claim 2, further comprising:

generating a human perceptible representation of the inference basis applied to the input data sample;

generating a human perceptible representation of the inference context applied to at least one of the alternative data samples; and generating a human perceptible representation of the inference basis applied to at least one of the similar data samples.

4. The method of claim 3, wherein:

the data samples are images;

the human perceptible representation of the inference basis is a heatmap indicating at least one pixel region associated with at least one of the discriminative features; and the human perceptible representation of the inference context is a heatmap indicating at least one pixel region associated with at least one of the contextual features.

5. The method of claim 1, wherein:

the neural network is a convolutional neural networking comprising at least a final convolution layer configured to generate an output activation map having a plurality of output channels, each output channel being associated with a feature of the plurality of features, each output channel comprising a plurality of activation values; and processing the data set, using the trained neural network, to generate the set of relationships comprises:

processing each respective data sample of the data set, using the trained convolutional neural network, to generate a respective output activation map of the final convolution layer;

for each feature of the plurality of features, processing the output activation maps to:

identify a first one or more data samples of the data set for which the respective output activation map has at least one activation value of the output channel corresponding to the feature above an activation threshold; and generating the set of relationships to include an association between the feature and the first one or more data samples.

6. The method of claim 5, wherein the activation threshold is generated by identifying an activation threshold value effective to identify a predetermined proportion of the data samples of the data set as the first one or more data samples.

7. The method of claim 1, wherein processing the set of relationships to generate the at least one CDP further comprises:

for each additional CDP of one or more additional CDPs:
selecting, from the plurality of features, the one or more contextual features of the additional CDP and the one or more discriminative features of the additional CDP such that the discriminativeness value of the inference basis within the inference context is above the discriminativeness threshold.

8. The method of claim 7, wherein processing the set of relationships to generate the at least one CDP further comprises:

for the first CDP and each additional CDP, computing a respective coverage value of the one or more contextual features of the respective CDP; and selecting, from the first CDP and the one or more additional CDPs, the at least one CDP such that each CDP of the at least one CDP has a coverage value above a coverage threshold.

9. The method of claim 8, wherein computing the coverage value of the one or more contextual features of a CDP comprises:

computing the second number indicating how many data samples in the positive data subset are associated with the one or more contextual features of the CDP;

computing the fourth number indicating how many data samples in the negative data subset are associated with the one or more contextual features of the CDP; and computing the coverage value as the lower of the second number and the fourth number.

10. A system comprising:

a processing system comprising one or more processor devices; and a memory storing instructions which, when executed by the processing system, cause the system to explain a basis for a binary inference task performed by a neural network trained to perform the binary inference task, by:

obtaining a data set comprising a plurality of data samples, the plurality of data samples comprising:

a negative data subset comprising a plurality of negative data samples associated with a negative result of the binary inference task performed by the trained neural network; and a positive data subset comprising a plurality of positive data samples associated with a positive result of the binary inference task performed by the trained neural network;

processing the data set, using the trained neural network, to generate a set of relationships between features and data samples, the set of relationships identifying, for each feature of a plurality of features, one or more data samples of the data set associated with the feature; and processing the set of relationships to generate at least one contextual discriminative pattern (CDP), each CDP identifying:

an inference context comprising one or more contextual features of the plurality of features, the inference context being associated with a first plurality of negative data samples of the negative data subset and a second plurality of positive data samples of the positive data subset; and an inference basis comprising one or more discriminative features of the plurality of features, wherein processing the set of relationships to generate at least one CDP comprises:

selecting, from the plurality of features, the one or more contextual features of a first CDP and the one or more discriminative features of the first CDP such that a discriminativeness value of the inference basis within the inference context is above a discriminativeness threshold, wherein the discriminativeness value of the inference basis within the inference context is computed as a difference between:

a first ratio between:

a first number indicating how many data samples in the positive data subset are associated with both the one or more discriminative features and the one or more contextual features; and a second number indicating how many data samples in the positive data subset are associated with the one or more contextual features; and a second ratio between:

a third number indicating how many data samples in the negative data subset are associated with both the one or more discriminative features and the one or more contextual features; and a fourth number indicating how many data samples in the negative data subset are associated with the one or more contextual features, wherein the inference basis is associated with the second plurality of positive data samples and the first plurality of negative data samples such that the first ratio is greater than the second ratio.

11. The system of claim 10, wherein the instructions, when executed by the processing system, further cause the system to:

obtain an input data sample to be explained;

process the input data sample using the trained neural network to determine that the input sample is associated with the positive result of the binary inference task;

process the input data sample and the at least one CDP to determine that the input sample is associated with:

the inference context of a first CDP of the at least one CDP; and the inference basis of the first CDP; and process the data set and the first CDP to generate:

one or more similar data samples sharing the inference context and the inference basis with the input data sample; and one or more alternative data samples sharing the inference context but not the inference basis with the input data sample.

12. The system of claim 11, wherein the instructions, when executed by the processing system, further cause the system to:

generate a human perceptible representation of the inference basis applied to the input data sample;

generate a human perceptible representation of the inference context applied to at least one of the alternative data samples; and generate a human perceptible representation of the inference basis applied to at least one of the similar data samples.

13. The system of claim 10, wherein processing the set of relationships to generate the at least one CDP further comprises:

for each additional CDP of one or more additional CDPs:

selecting, from the plurality of features, the one or more contextual features of the additional CDP and the one or more discriminative features of the additional CDP such that the discriminativeness value of the inference basis within the inference context is above the discriminativeness threshold.

14. The system of claim 13, wherein processing the set of relationships to generate the at least one CDP further comprises:

for the first CDP and each additional CDP, computing a respective coverage value of the one or more contextual features of the respective CDP; and selecting, from the first CDP and the one or more additional CDPs, the at least one CDP such that each CDP of the at least one CDP has a coverage value above a coverage threshold.

15. A non-transitory computer-readable medium having instructions tangibly stored thereon that, when executed by a processing system, cause the processing system to perform the method of claim 1.

16. A non-transitory computer-readable medium having instructions tangibly stored thereon that, when executed by a processing system, cause the processing system to explain a basis for a binary inference task performed by a neural network trained to perform the binary inference task, by:

obtaining a data set comprising a plurality of data samples, the plurality of data samples comprising:

a negative data subset comprising a plurality of negative data samples associated with a negative result of the binary inference task performed by the trained neural network; and a positive data subset comprising a plurality of positive data samples associated with a positive result of the binary inference task performed by the trained neural network;

processing the data set, using the trained neural network, to generate a set of relationships between features and data samples, the set of relationships identifying, for each feature of a plurality of features, one or more data samples of the data set associated with the feature; and processing the set of relationships to generate at least one contextual discriminative pattern (CDP), each CDP identifying:

an inference context comprising one or more contextual features of the plurality of features, the inference context being associated with a first plurality of negative data samples of the negative data subset and a second plurality of positive data samples of the positive data subset; and an inference basis comprising one or more discriminative features of the plurality of features, wherein processing the set of relationships to generate at least one CDP comprises:

selecting, from the plurality of features, the one or more contextual features of a first CDP and the one or more discriminative features of the first CDP such that a discriminativeness value of the inference basis within the inference context is above a discriminativeness threshold, wherein the discriminativeness value of the inference basis within the inference context is computed as a difference between:

a first ratio between:

a first number indicating how many data samples in the positive data subset are associated with both the one or more discriminative features and the one or more contextual features; and a second number indicating how many data samples in the positive data subset are associated with the one or more contextual features; and a second ratio between:

a third number indicating how many data samples in the negative data subset are associated with both the one or more discriminative features and the one or more contextual features; and a fourth number indicating how many data samples in the negative data subset are associated with the one or more contextual features, wherein the inference basis is associated with the second plurality of positive data samples and the first plurality of negative data samples such that the first ratio is greater than the second ratio.

* * * * *